(12) United States Patent
Kim et al.

(10) Patent No.: US 12,742,294 B2
(45) Date of Patent: Sep. 22, 2026

(54) NONWOVEN FABRIC-INTEGRATED SLEEPER PAD USING RUBBER PAD EMBEDDED WITH STIFFENER AND METHODS OF MANUFACTURING AND CONSTRUCTING THE SAME

(71) Applicant: KOREA RAILROAD RESEARCH INSTITUTE, Gyeonggi-do (KR)

(72) Inventors: Dae Sang Kim, Gyeonggi-do (KR); Ungjin Kim, Gyeonggi-do (KR)

(73) Assignee: KOREA RAILROAD RESEARCH INSTITUTE, Gyeonggi-do (KR)

(*) Notice: Subject to any disclaimer, the term of this patent is extended or adjusted under 35 U.S.C. 154(b) by 948 days.

(21) Appl. No.: 17/983,399

(22) Filed: Nov. 9, 2022

(65) Prior Publication Data

US 2023/0374736 A1 Nov. 23, 2023

(30) Foreign Application Priority Data

May 17, 2022 (KR) ........................ 10-2022-0059991

(51) Int. Cl.
*E01B 3/36* (2006.01)
*B32B 3/08* (2006.01)
(Continued)

(52) U.S. Cl.
CPC .................. *E01B 3/36* (2013.01); *B32B 3/08* (2013.01); *B32B 5/022* (2013.01); *B32B 7/12* (2013.01);
(Continued)

(58) Field of Classification Search
CPC ..... E01B 3/36; E01B 3/46; E01B 3/32; E01B 3/40; E01B 3/42; E01B 3/44; E01B 19/003; E01B 2204/01; E01B 9/68; B32B 3/08; B32B 5/022; B32B 7/12; B32B 25/10; B32B 25/14; B32B 37/12; B32B 37/203; B32B 38/0004; B32B 2250/03;
(Continued)

(56) References Cited

U.S. PATENT DOCUMENTS 4,720,043 A * 1/1988 Ortwein .................. E01B 1/001 404/31
2007/0290061 A1* 12/2007 Sears .................... E01B 19/003 238/150

(Continued)

FOREIGN PATENT DOCUMENTS

CN 104095504 A * 10/2014
CN 111235971 A * 6/2020 ............... E01B 9/68

(Continued)

*Primary Examiner* — S. Joseph Morano
*Assistant Examiner* — James William Jones
(74) *Attorney, Agent, or Firm* — JCIPRNET

(57) ABSTRACT

The present disclosure provides, as a sleeper pad for railroad sleepers in which a nonwoven fabric is attached to a rubber pad by a thermal fusion process, a nonwoven fabric-integrated sleeper pad using a rubber pad embedded with a stiffener and methods of manufacturing and constructing the same, which can adjust vertical support stiffness of the rubber pad by the stiffener embedded in the middle of the rubber pad and which can secure the flatness of the rubber pad by resisting bending deformation due to a difference in shrinkage between rubber and nonwoven fabric.

19 Claims, 23 Drawing Sheets

(51) Int. Cl.

| | |
|---|---|
| ***B32B 5/02*** | (2006.01) |
| ***B32B 7/12*** | (2006.01) |
| ***B32B 25/10*** | (2006.01) |
| ***B32B 25/14*** | (2006.01) |
| ***B32B 37/12*** | (2006.01) |
| ***B32B 37/20*** | (2006.01) |
| ***B32B 38/00*** | (2006.01) |
| ***E01B 19/00*** | (2006.01) |
| *B28B 1/00* | (2006.01) |
| *B28B 3/02* | (2006.01) |
| *B29C 43/20* | (2006.01) |
| *B29C 43/24* | (2006.01) |
| *B29C 65/02* | (2006.01) |

(52) U.S. Cl.

CPC .............. *B32B 25/10* (2013.01); *B32B 25/14* (2013.01); *B32B 37/12* (2013.01); *B32B 37/203* (2013.01); *B32B 38/0004* (2013.01); *E01B 19/003* (2013.01); *B28B 1/008* (2013.01); *B28B 3/02* (2013.01); *B29C 43/206* (2013.01); *B29C 43/24* (2013.01); *B29C 65/02* (2013.01); *B32B 2250/03* (2013.01); *B32B 2250/40* (2013.01); *B32B 2260/021* (2013.01); *B32B 2260/044* (2013.01); *B32B 2305/20* (2013.01); *B32B 2319/00* (2013.01); *E01B 2204/01* (2013.01)

(58) Field of Classification Search

CPC .......... B32B 2250/40; B32B 2260/021; B32B 2260/044; B32B 2260/048; B32B 2305/20; B32B 2319/00; B32B 2262/101; B32B 2307/56; B32B 2307/734; B28B 1/008; B28B 3/02; B29C 43/206; B29C 43/24; B29C 65/02

USPC ....................................... 238/37, 83–85, 103

See application file for complete search history.

(56) References Cited

U.S. PATENT DOCUMENTS

| | | | | |
|---|---|---|---|---|
| 2009/0162651 | A1* | 6/2009 | Rios | A63B 60/08 428/419 |
| 2010/0320281 | A1* | 12/2010 | Potocan | E01B 3/46 238/29 |
| 2012/0219746 | A1* | 8/2012 | Powell | B09B 1/004 428/221 |
| 2013/0193222 | A1 | 8/2013 | Carels | |
| 2016/0194835 | A1* | 7/2016 | Miessbacher | E01B 9/68 238/275 |
| 2016/0333547 | A1* | 11/2016 | Winter | B29C 70/08 |
| 2018/0370063 | A1* | 12/2018 | Lehmann | B32B 27/12 |
| 2020/0180192 | A1* | 6/2020 | Deshpande | B29C 43/24 |
| 2021/0212491 | A1* | 7/2021 | Augustin | B32B 25/10 |
| 2022/0002088 | A1* | 1/2022 | Whitehead | B32B 5/028 |

FOREIGN PATENT DOCUMENTS

| | | | | | |
|---|---|---|---|---|---|
| KR | 20040095408 | A | * | 11/2004 | B32B 37/0046 |
| KR | 100699548 | | | 3/2007 | |
| KR | 20080027450 | | | 3/2008 | |
| KR | 20130136192 | A | * | 12/2013 | D04H 1/60 |
| KR | 20140011762 | | | 1/2014 | |
| KR | 20140011762 | A | * | 1/2014 | E01B 19/003 |
| KR | 20150111547 | | | 10/2015 | |
| KR | 20150111547 | A | * | 10/2015 | E01B 3/32 |
| KR | 20190115293 | A | * | 10/2019 | E01B 7/22 |
| KR | 20210005552 | | | 1/2021 | |
| KR | 102212757 | B1 | * | 2/2021 | E01B 37/00 |
| KR | 102363912 | | | 2/2022 | |
| WO | WO-2019201761 | A1 | * | 10/2019 | E01B 3/46 |
| WO | WO-2022069512 | A1 | * | 4/2022 | E01B 3/46 |

* cited by examiner

| SERIAL NUMBER | TEST ITEM | UNIT | TEST METHOD | TEST RESULT | |
|---|---|---|---|---|---|
| | | | | Kstat [N/mm] | Cstat [N/mm$^2$] |
| 1 | STATIC STIFFNESS TEST FOR SLEEPER PAD BLOCK | - | BS EN 16730-2016 | 10942.01 | 0.18 |
| 2 | DYNAMIC STIFFNESS TEST FOR SLEEPER PAD BLOCK | | | 12982.71 | 0.21 |

- STATIC STIFFNESS LOADING RATE : 0.01 N/MM$^2$/S
- DYNAMIC STIFFNESS LOADING RATE : 5 Hz/500 times
- LOADING CONDITION · STATIC STIFFNESS (Fmax = 15625N, Ftest1 = 6250N, Fmin = 625N, 0.7Fmin = 437.5N)
- TEST PIECE AREA : 62.500 mm$^2$

NONWOVEN FABRIC-INTEGRATED SLEEPER PAD USING RUBBER PAD EMBEDDED WITH STIFFENER AND METHODS OF MANUFACTURING AND CONSTRUCTING THE SAME

CROSS-REFERENCE TO RELATED APPLICATION

This application claims priority to and the benefit of Korean Patent Application No. 10-2022-0059991, filed on May 17, 2022, the disclosure of which is incorporated herein by reference in its entirety.

BACKGROUND

1. Field of the Invention

The present disclosure relates to a nonwoven fabric-integrated sleeper pad, and more particularly, to a nonwoven fabric-integrated sleeper pad in which a nonwoven fabric is embedded in a surface of a concrete sleeper and, to resist horizontal deformation of the sleeper pad, one or more stiffeners are embedded in a rubber pad in close contact with the nonwoven fabric and methods of manufacturing and constructing the nonwoven fabric-integrated sleeper pad.

2. Discussion of Related Art

Generally, vibration generated during train travel causes shaking, cracking, and the like, which adversely affects the usability and safety of structures and causes noise and vibration pollution for the surrounding living environment.

In response to this, with an increase in interest in the environment and the development of anti-vibration technology, technologies related to anti-vibration facilities of railways have been actively developed.

Also, concrete ballasts have been used in subway lines, long tunnels, crossings, and the like where repair work is inconvenient, and, in recent years, have been widely used in urban and high-speed railways for the purpose of extending the repair cycle and increasing strength.

These concrete ballasts are gradually replacing the existing gravel ballasts due to the advantages of being economically feasible despite high investment cost, not causing a significant track irregularity, and being able to maintain good riding comfort without maintenance and repair of the track.

However, concrete ballasts require a separate anti-vibration facility due to low elasticity of the track, which causes high impact and noise.

Meanwhile, FIG. 1 is a cross-sectional view illustrating an anti-vibration sleeper structure according to the related art.

Referring to FIG. 1, in an anti-vibration sleeper according to the related art, a rail pad 8 is installed at a lower portion of a rail 3, and a lower portion of a reinforced concrete (RC) sleeper or a prestressed concrete (PC) sleeper is covered with an anti-vibration box 6 in the form of a rubber box in which an anti-vibration pad 7 is laid.

According to such a structure, a concrete ballast 1 has track elasticity similar to that of a gravel ballast. Vibrations in a low frequency range that affect the track may be filtered by the anti-vibration pad 7 at a lower portion of a sleeper 2, and vibrations in a high frequency range may be reduced by the rail pad 8.

However, not only is it essential to repair the track with an increase in the volume and frequency of transportation on railways, but also the anti-vibration box or anti-vibration pad cannot continuously maintain the modulus of elasticity and damping factor over time and undergoes the process of aging.

In particular, in a process of installing the anti-vibration box and an elastic pad and placing the concrete ballast, a problem in which a fixed point of the anti-vibration box shakes or a side surface of the anti-vibration box forms a gap due to pressure of the concrete acting on a lower surface of the anti-vibration box may occur.

Also, even a slight gap may cause movement of the sleeper relative to the anti-vibration pad and the anti-vibration box while the train passes, which not only causes a track irregularity but also causes the elastic pad or the anti-vibration box to further age due to an intensive load acting on a corner of the sleeper.

Therefore, although it is necessary to reinstall the anti-vibration pad and the anti-vibration box when repairing the ballast or the sleeper, since the standards of the anti-vibration box and the existing space on the concrete ballast in which the sleeper is embedded cannot be said to uniformly match each other, there are problems that, even when the anti-vibration pad and the anti-vibration box are replaced and repaired, it is difficult to obtain the same anti-vibration effect, and a track irregularity may be caused.

Meanwhile, FIG. 2 is a view illustrating a wide sleeper in which a nonwoven fabric is attached to a bottom surface according to the related art.

In a wide sleeper 10 in which a nonwoven fabric is attached to a bottom surface according to the related art, as illustrated in FIG. 2, both wide portions 12 are formed at both sides of a sleeper central portion 11, rail fastening device seating portions 13 are formed at both end portions, and here, a nonwoven fabric 14 is pre-attached to bottom surfaces of both wide portions 12.

The nonwoven fabric 14 can partially correct construction errors in the construction of an asphalt roadbed, absorb impact of a train load to efficiently transmit the load to the asphalt roadbed at a lower portion, evenly transmit the train load to the asphalt roadbed to prevent damage caused by stress concentration, and improve frictional resistance between a lower surface of the wide sleeper and the asphalt roadbed to control a horizontal force acting in a transverse direction and a longitudinal direction.

That is, by the nonwoven fabric being installed between the wide sleeper 10 and the asphalt roadbed whose upper surface is relatively flat and elastic, breaking load and frictional resistance can be secured.

Meanwhile, FIG. 3A is a view illustrating a case in which an anti-vibration pad used on a gravel ballast is installed according to the related art, FIG. 3B is a view illustrating an example of an anti-vibration sleeper pad for a railway gravel track according to the related art, and FIG. 4 is a view illustrating another example of an anti-vibration sleeper pad for a railway gravel track according to the related art.

As illustrated in FIG. 3A, an anti-vibration pad used on a gravel ballast according to the related art is an anti-vibration pad 21 provided on a floor surface of a concrete sleeper 20 which is a medium between a rail 25 and gravel 22. The anti-vibration pad 21 is formed so that a special paving layer 21*b* is provided on a floor surface of a rubber layer 21*a*.

Here, in the anti-vibration pad 21, compounded rubber 21*d*, which is made of an ethylene propylene diene monomer (EPDM), and the special paving layer 21*b* are stacked to intersect each other.

For example, in the special paving layer 21*b*, a special paving material 21*c* formed of one of a nylon tire cord, a polyester tire cord, and an aramid fiber or a combination of two or more thereof is coated with the compounded rubber 21*d*.

Therefore, a molded product in which the compounded rubber 21*d* and the special paving layer 21*b* are stacked to intersect each other may be inserted into a mold and vulcanized for 20 to 70 minutes in a press at a temperature of 140 to 220° C. to manufacture the anti-vibration pad 21 with a certain hardness.

The anti-vibration pad 21 is attached to the floor surface of the concrete sleeper 20 via an adhesive, an adhesive tape made of butyl rubber, a cement primer, or a cement adhesive.

Also, the anti-vibration pad 21 may be attached to the entire floor surface, both side ends, or a central portion of the concrete sleeper 20 or may be formed by being forcibly fitted to the floor surface of the concrete sleeper 20.

Accordingly, the anti-vibration pad 21 installed on a concrete sleeper installed on a gravel ballast may be used to reduce vibration and noise in the process in which a train passes.

Also, as illustrated in FIG. 3B, in the case of an anti-vibration sleeper pad for a railway gravel track according to the related art, a base plate 21 having a flat structure like the shape of a lower surface of a concrete sleeper 20 is integrally formed with a plurality of fixing protrusions 26 disposed at predetermined intervals on an upper surface of the base plate 21 and protruding upward, and the base plate 21 may have a shape that is vertically symmetrical.

Also, as illustrated in FIG. 4, in the case of an anti-vibration sleeper pad for a railway gravel track according to the related art, due to an error in pad manufacturing or a tolerance in the manufacture of the concrete sleeper 20, the length or width of the pad may be long, and a phenomenon may occur in which, when the pad is attached to the concrete sleeper, the pad is caught in a formwork. Therefore, within a range in which it is possible to prevent a decrease in a vibration reducing effect, the anti-vibration sleeper pad may be formed to have a size smaller than the size of the lower surface of the concrete sleeper 20.

Meanwhile, as the related art of a sleeper pad, Korean Patent Registration No. 10-2363912 which has been filed by the applicant of the present disclosure and registered as a patent discloses "sleeper pad using rubber pad integrated with nonwoven fabric and method of constructing the same," which will be described below with reference to FIGS. 5A, 5B, 6A, and 6B and is incorporated herein by reference.

FIG. 5A is a cross-sectional view illustrating a sleeper pad using a rubber pad integrated with a nonwoven fabric according to the related art, FIG. 5B is a view for describing the manufacture of the sleeper pad illustrated in FIG. 5A, FIG. 6A is a view for describing bending of a rubber pad that is caused by a difference in stiffness between rubber and nonwoven fabric in the sleeper pad using the rubber pad integrated with the nonwoven fabric according to the related art, and FIG. 6B is a view for describing a case in which the sleeper quality is degraded due to a rubber pad with low flatness in the sleeper pad using the rubber pad integrated with the nonwoven fabric according to the related art.

Referring to FIGS. 5A and 5B, a sleeper pad 30 using a rubber pad integrated with a nonwoven fabric according to the related art is the sleeper pad 30 including a nonwoven fabric 32 embedded in a sleeper bottom surface and a rubber pad 31 integrated with the nonwoven fabric 32 and exposed to the sleeper bottom surface.

The nonwoven fabric 32 is embedded by being pressed toward a surface of concrete placed in a sleeper formwork, and as the placed concrete is cured, the sleeper pad 30 is attached to the sleeper bottom surface, and an attaching force with the sleeper can be secured.

Specifically, as illustrated in FIG. 5B, in the sleeper pad 30 using the rubber pad integrated with the nonwoven fabric according to the related art, in a process in which the rubber pad 31 in close contact with the nonwoven fabric 32 is heated and pressed, the nonwoven fabric 32 and the rubber pad 31 are entangled on a close contact surface and are mechanically coupled and vulcanized. In addition, as the close contact surface between the nonwoven fabric 32 and the rubber pad 31 is melted and diffused, the nonwoven fabric 32 and the rubber pad 31 are chemically bonded, and thus the rubber pad 31 and the nonwoven fabric 32 are integrated.

However, in the case of the existing rubber pad in the sleeper pad using the rubber pad integrated with the nonwoven fabric according to the related art, in a process of attaching the nonwoven fabric to rubber by melting the nonwoven fabric, a difference may occur in shrinkability due to a difference in stiffness between the rubber and the nonwoven fabric.

In FIG. 6A, a) shows a case in which the shrinkage of rubber is greater than the shrinkage of nonwoven fabric, and b) shows a case in which the shrinkage of rubber is smaller than the shrinkage of nonwoven fabric. During production of a rubber pad, rubber pad bending may occur due to a difference in stiffness between rubber and nonwoven fabric in each case.

Also, as illustrated in FIG. 6B, when a rubber pad with low flatness is attached to a sleeper, in the process of attaching the rubber pad and curing concrete, the rubber pad is bent further, and a thickness of the sleeper is not constant.

Accordingly, there is a problem that an effect of increasing service life of gravel of a pad-attached sleeper and service life of the sleeper may be reduced.

RELATED ART DOCUMENTS

Patent Documents (Patent Document 0001) Korean Patent Registration No. 10-2363912 (Date of Registration: Feb. 11, 2022), Title of Disclosure: "Sleeper pad using rubber pad integrated with nonwoven fabric and method of constructing the same"

(Patent Document 0002) Korean Patent Publication No. 2015-111547 (Date of Publication: Oct. 6, 2015), Title of Disclosure: "Wide sleeper for direct-connected track on asphalt roadbed and method of constructing the same"

(Patent Document 0003) Korean Patent Publication No. 2014-11762 (Date of Publication: Jan. 29, 2014), Title of Disclosure: "Anti-vibration pad for concrete sleeper"

(Patent Document 0004) Korean Patent Registration No. 10-699548 (Date of Registration: Mar. 8, 2007), Title of Disclosure: "Anti-vibration sleeper pad for railway gravel track"

(Patent Document 0005) Korean Patent Publication No. 2021-5552 (Date of Publication: Jan. 14, 2021), Title of Disclosure: "Sleeper pad for dry concrete"

(Patent Document 0006) Korean Patent Publication No. 2008-27450 (Date of Publication: Mar. 27, 2008), Title of Disclosure: "Rail track sleeper"

SUMMARY OF THE INVENTION

The present disclosure is directed to providing, as a sleeper pad for railroad sleepers in which a nonwoven fabric is attached to a rubber pad by a thermal fusion process, a nonwoven fabric-integrated sleeper pad using a rubber pad embedded with a stiffener and methods of manufacturing and constructing the same, which can adjust vertical support stiffness of the rubber pad by the stiffener embedded in the middle of the rubber pad and which can secure the flatness of the rubber pad by resisting bending deformation due to a difference in shrinkage between rubber and nonwoven fabric.

The present disclosure is also directed to providing a nonwoven fabric-integrated sleeper pad using a rubber pad embedded with a stiffener and methods of manufacturing and constructing the same, which can increase utilization and quality of a pad-attached sleeper by embedding a stiffener in the middle of a rubber pad attached to a lower portion of a concrete sleeper to adjust vertical support stiffness and secure flatness.

One aspect of the present disclosure provides a nonwoven fabric-integrated sleeper pad using a rubber pad embedded with a stiffener, the nonwoven fabric-integrated sleeper pad including: a rubber pad formed of multiple layers including a lower rubber pad and an upper rubber pad, integrated with an attaching nonwoven fabric, and exposed to a bottom surface of a concrete sleeper; a stiffener horizontally embedded in the rubber pad; and the attaching nonwoven fabric configured to come in close contact with a bottom surface of the lower rubber pad of the rubber pad and embedded in the bottom surface of the concrete sleeper, wherein the stiffener resists horizontal deformation of the rubber pad to increase vertical stiffness, and the attaching nonwoven fabric is embedded by being pressed toward a surface of concrete placed in a sleeper formwork, and as the placed concrete is cured, the nonwoven fabric-integrated sleeper pad is embedded in the bottom surface of the concrete sleeper to secure an attaching force with the concrete sleeper.

Here, the stiffener may be formed of a lattice-shaped glass fiber and may be provided as one or more stiffeners horizontally disposed in a middle of the rubber pad.

Here, the stiffener may be horizontally mounted on an upper portion of the lower rubber pad of the rubber pad and may be adhered using an adhesive.

Here, in a state in which the stiffener is horizontally embedded between the lower rubber pad and the upper rubber pad, the lower rubber pad and the upper rubber pad may be adhered to each other by a thermal fusion process.

Here, the rubber pad may include: a lower rubber pad having a bottom surface with which the attaching nonwoven fabric comes in close contact and an upper surface on which the stiffener is mounted; and an upper rubber pad adhered to the lower rubber pad by a thermal fusion process, wherein the upper rubber pad may be provided as one or more upper rubber pads which are sequentially stacked, and the rubber pad may be formed of multiple layers.

Here, in a process in which the lower rubber pad in close contact with the attaching nonwoven fabric is heated and pressed, the attaching nonwoven fabric and the lower rubber pad may be entangled on a close contact surface, thus coming in close contact and being mechanically coupled, and may be chemically bonded as the close contact surface between the attaching nonwoven fabric and the lower rubber pad is melted and diffused due to vulcanization, thus allowing the attaching nonwoven fabric to be integrated with the bottom surface of the lower rubber pad.

Here, the concrete sleeper in which the attaching nonwoven fabric is embedded is a concrete sleeper including an intermediate connecting portion disposed between expansion flanges at both ends. The nonwoven fabric-integrated sleeper pad which is exposed only to bottom surfaces of the expansion flanges at both ends comes in contact with gravel.

Here, the attaching nonwoven fabric may be embedded in a surface of concrete using a pressing plate so that the nonwoven fabric-integrated sleeper pad is able to be set with an equivalent pressure on the concrete placed in the sleeper formwork, and in a process in which concrete for manufacturing a concrete sleeper is cured, the nonwoven fabric-integrated sleeper pad may be attached to a bottom surface of the concrete sleeper.

Here, for the nonwoven fabric-integrated sleeper pad, the rubber pad may be cut to be apart from an end of the concrete sleeper, the nonwoven fabric-integrated sleeper pad may be attached only to a portion where a load is intensively transmitted by a rail, and by performing rounding treatment on a corner portion of the nonwoven fabric-integrated sleeper pad, an attaching force with the concrete sleeper may be secured.

Here, for the rubber pad, an ethylene propylene diene monomer (EPDM) compounded rubber may be formed into a thin sheet plate, and the rubber pad may be integrated with the attaching nonwoven fabric having a surface made of a dense material and may be used as the nonwoven fabric-integrated sleeper pad.

Meanwhile, another aspect of the present disclosure provides a method of manufacturing a nonwoven fabric-integrated sleeper pad using a rubber pad embedded with a stiffener, the method including: a) manufacturing ethylene propylene diene monomer (EPDM) compounded rubber in which EPDM and rubber are mixed with a mixer; b) winding an attaching nonwoven fabric having a surface made of a dense material around a roll; c) manufacturing a lower rubber pad and an upper rubber pad by forming a thin plate in which the EPDM compounded rubber is formed into a sheet through a calendering process; d) mounting and adhering a lattice-shaped stiffener onto the lower rubber pad; e) forming a rubber pad embedded with the stiffener by adhering the upper rubber pad to the lower rubber pad by a thermal fusion process; f) bringing the attaching nonwoven fabric in close contact with a bottom surface of the rubber pad embedded with the stiffener; g) by, through a rotor curing process, heating and pressing the lower rubber pad in close contact with the attaching nonwoven fabric, allowing the attaching nonwoven fabric and the lower rubber pad to be entangled on a close contact surface and mechanically coupled; h) allowing the attaching nonwoven fabric and the lower rubber pad to be integrated by a chemical bonding process as the close contact surface between the attaching nonwoven fabric and the lower rubber pad is melted and diffused due to vulcanization; and i) cutting the rubber pad, with which the nonwoven fabric is in close contact by being mechanically coupled and chemically bonded thereto, in a predetermined size to form the nonwoven fabric-integrated sleeper pad, wherein the stiffener is horizontally embedded in the rubber pad to resist horizontal deformation of the rubber pad and increase vertical stiffness, and the attaching nonwoven fabric is embedded by being pressed toward a surface of concrete placed in a sleeper formwork, and as the placed concrete is cured, the nonwoven fabric-integrated sleeper pad is embedded in a bottom surface of the concrete sleeper to secure an attaching force with the concrete sleeper.

Meanwhile, still another aspect of the present disclosure provides a method of constructing a nonwoven fabric-integrated sleeper pad using a rubber pad embedded with a stiffener, the method including: a) forming a nonwoven fabric-integrated sleeper pad, with which an attaching nonwoven fabric is in close contact, on a bottom surface of a rubber pad embedded with a stiffener; b) placing concrete in a sleeper formwork; c) pressing a surface of the concrete placed in the sleeper formwork so that the attaching nonwoven fabric of the nonwoven fabric-integrated sleeper pad is embedded; d) as the placed concrete is cured, integrating the nonwoven fabric-integrated sleeper pad with a bottom surface of a concrete sleeper; and e) placing the concrete sleeper having the nonwoven fabric-integrated sleeper pad attached to the bottom surface thereof on a gravel ballast, wherein the stiffener of step a) is horizontally embedded in the rubber pad to resist horizontal deformation of the rubber pad and increase vertical stiffness, and the attaching nonwoven fabric is embedded by being pressed toward the surface of the concrete placed in the sleeper formwork, and as the placed concrete is cured, the nonwoven fabric-integrated sleeper pad is embedded in the bottom surface of the concrete sleeper to secure an attaching force with the concrete sleeper.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 11 is a view illustrating results of the vertical stiffness test of the nonwoven fabric-integrated sleeper pad using the rubber pad embedded with the stiffener according to an embodiment of the present disclosure;

DETAILED DESCRIPTION OF EXEMPLARY EMBODIMENTS

Figure 1:
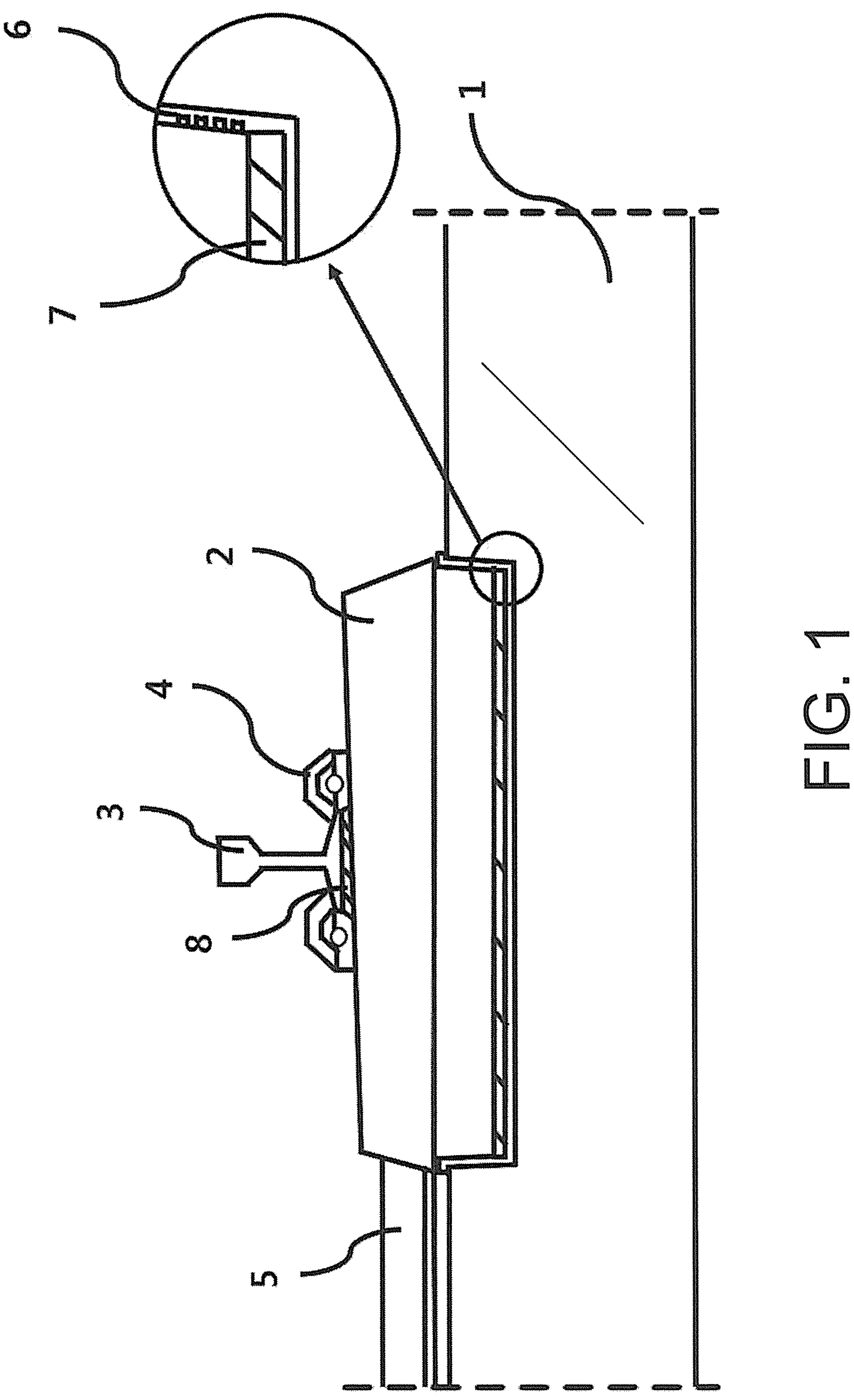
FIG. 1 is a cross-sectional view illustrating an anti-vibration sleeper structure according to the related art.
Figure 2:
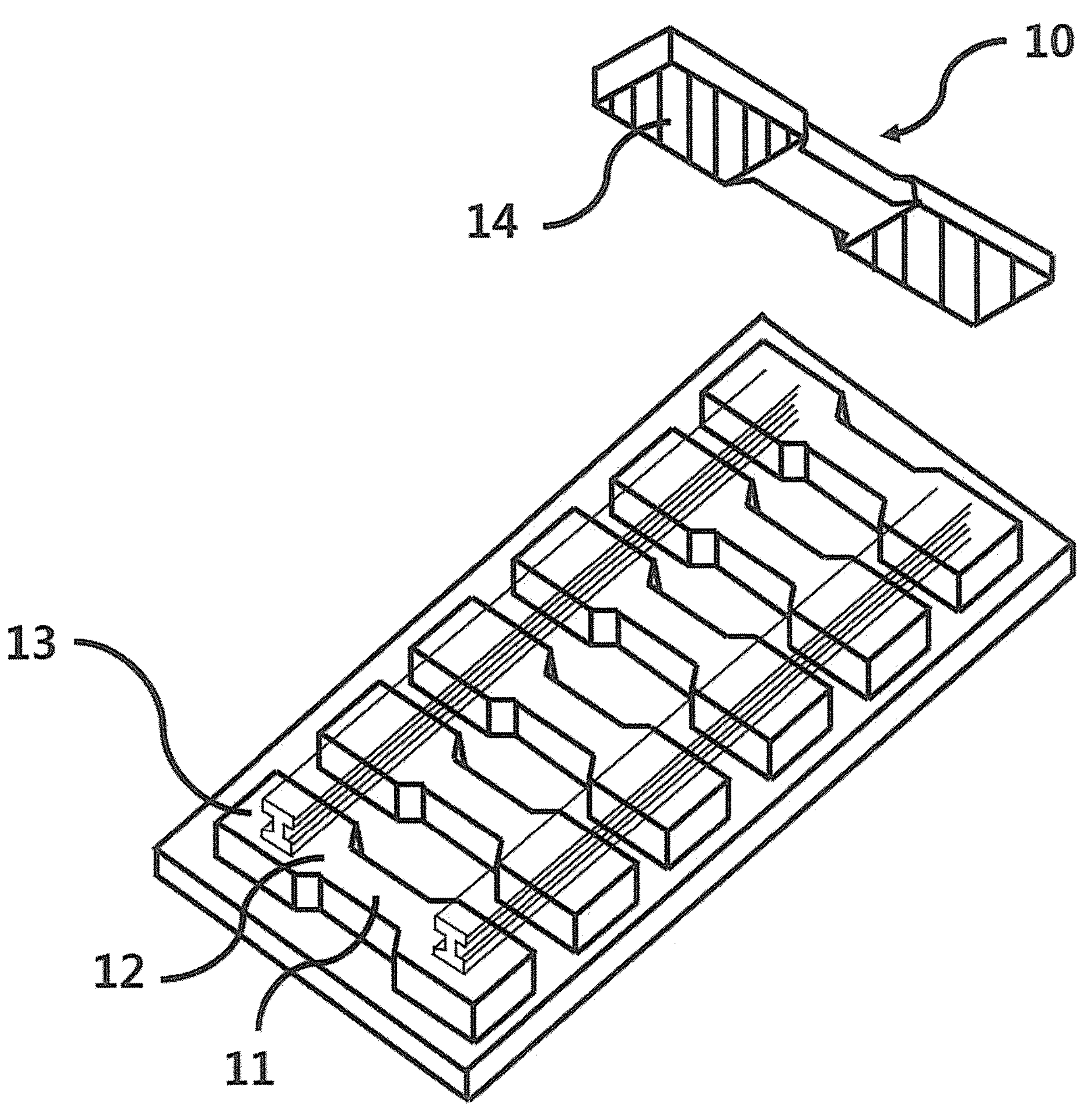
FIG. 2 is a view illustrating a wide sleeper in which a nonwoven fabric is attached to a bottom surface according to the related art.
Figure 3A:
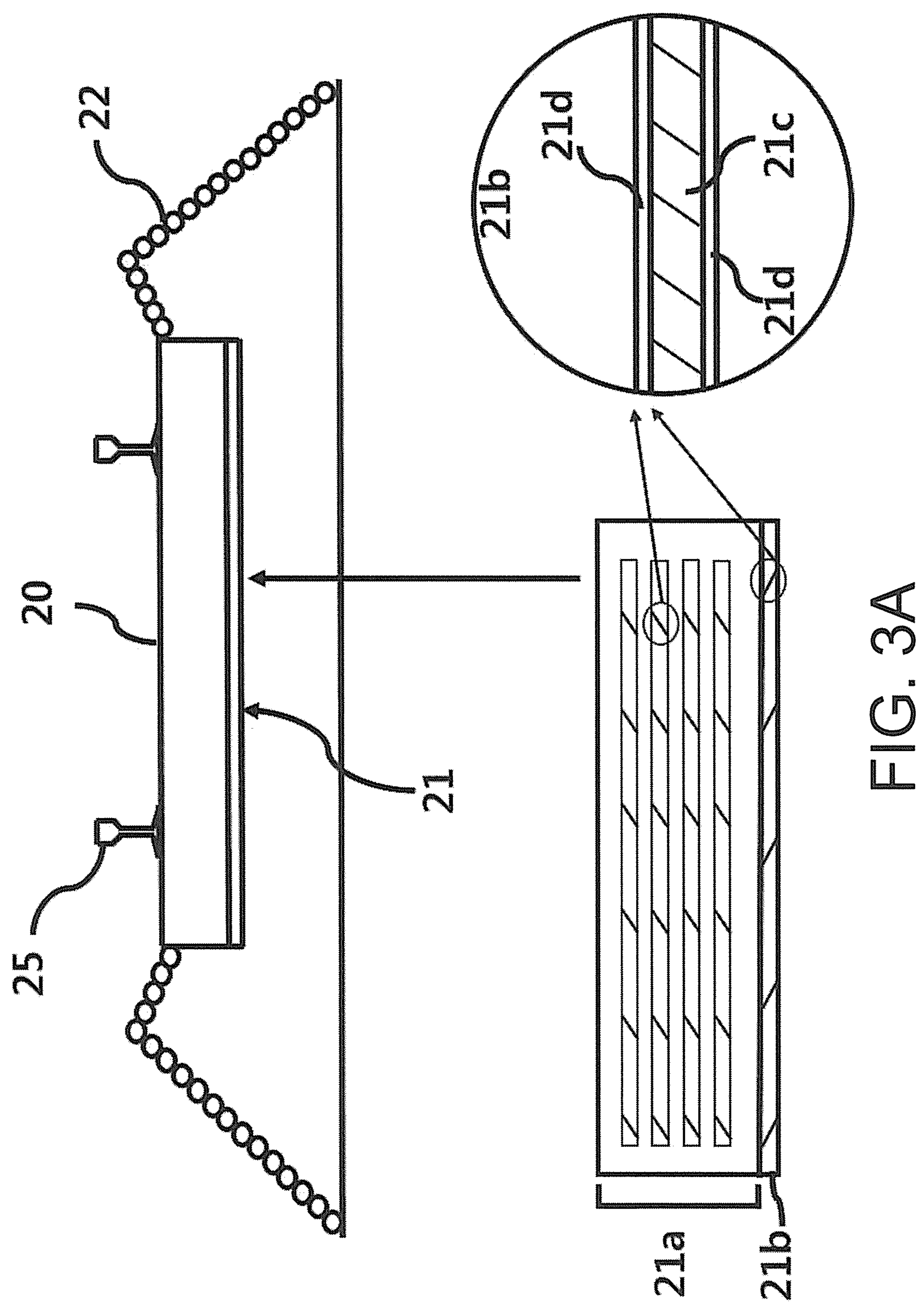
FIG. 3A is a view illustrating a case in which an anti-vibration pad used on a gravel ballast is installed according to the related art.
Figure 3B:
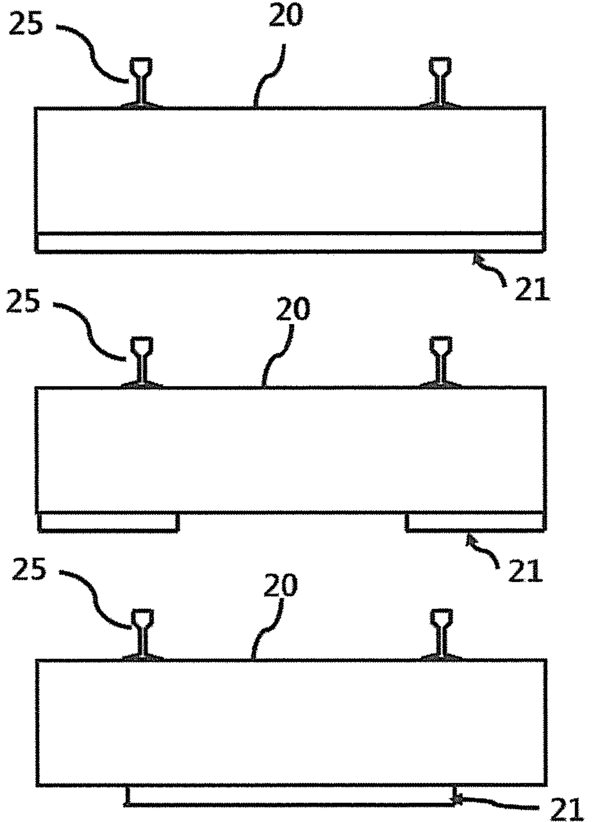
FIG. 3B is a view illustrating an example of an anti-vibration sleeper pad for a railway gravel track according to the related art.
Figure 3B:
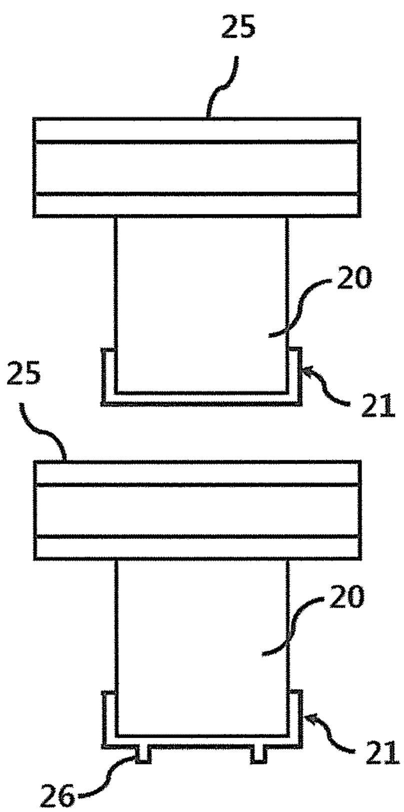
Figure 4:
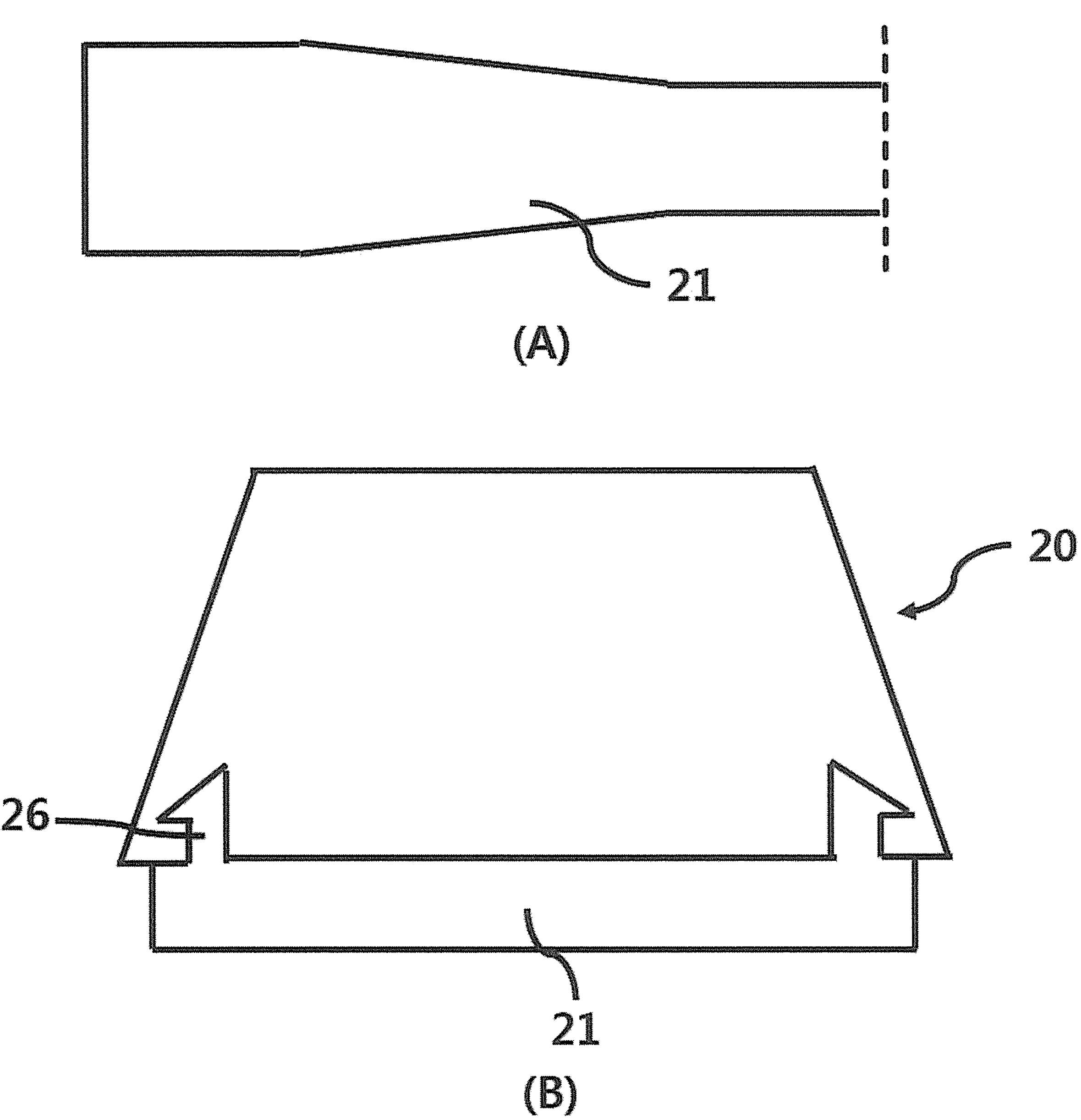
FIG. 4 is a view illustrating another example of an anti-vibration sleeper pad for a railway gravel track according to the related art.
Figure 5A:
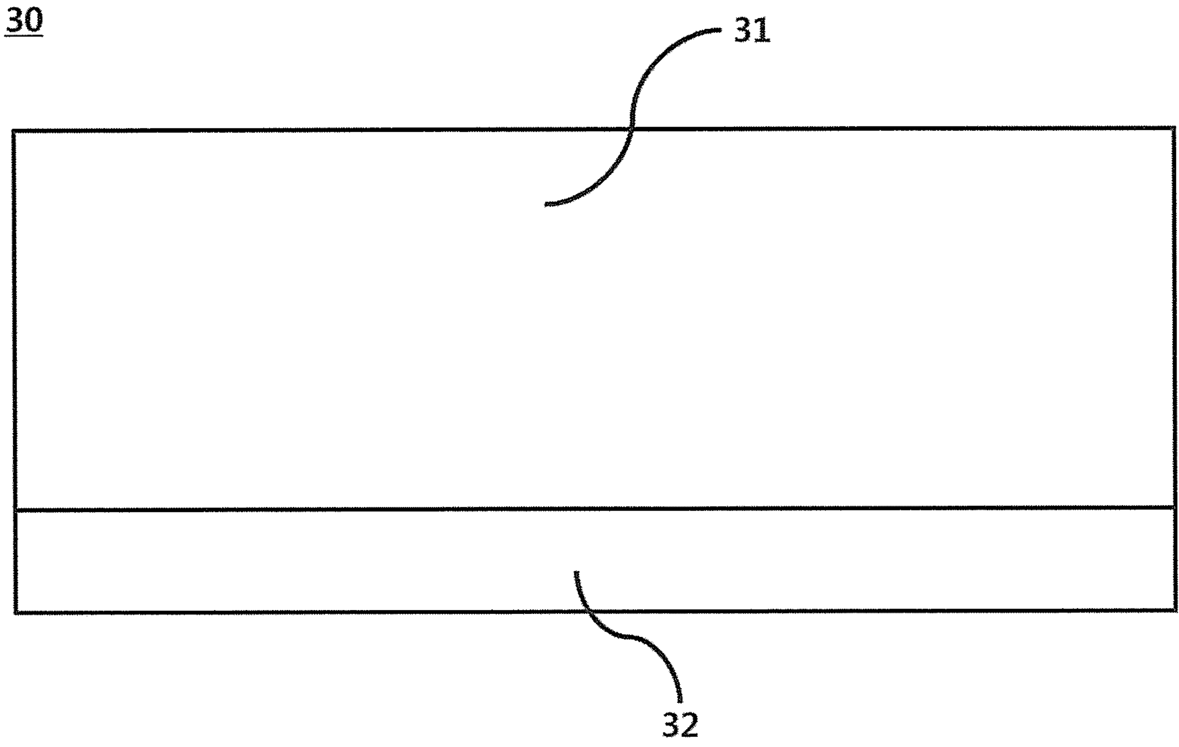
FIG. 5A is a cross-sectional view illustrating a sleeper pad using a rubber pad integrated with a nonwoven fabric according to the related art.
Figure 5B:
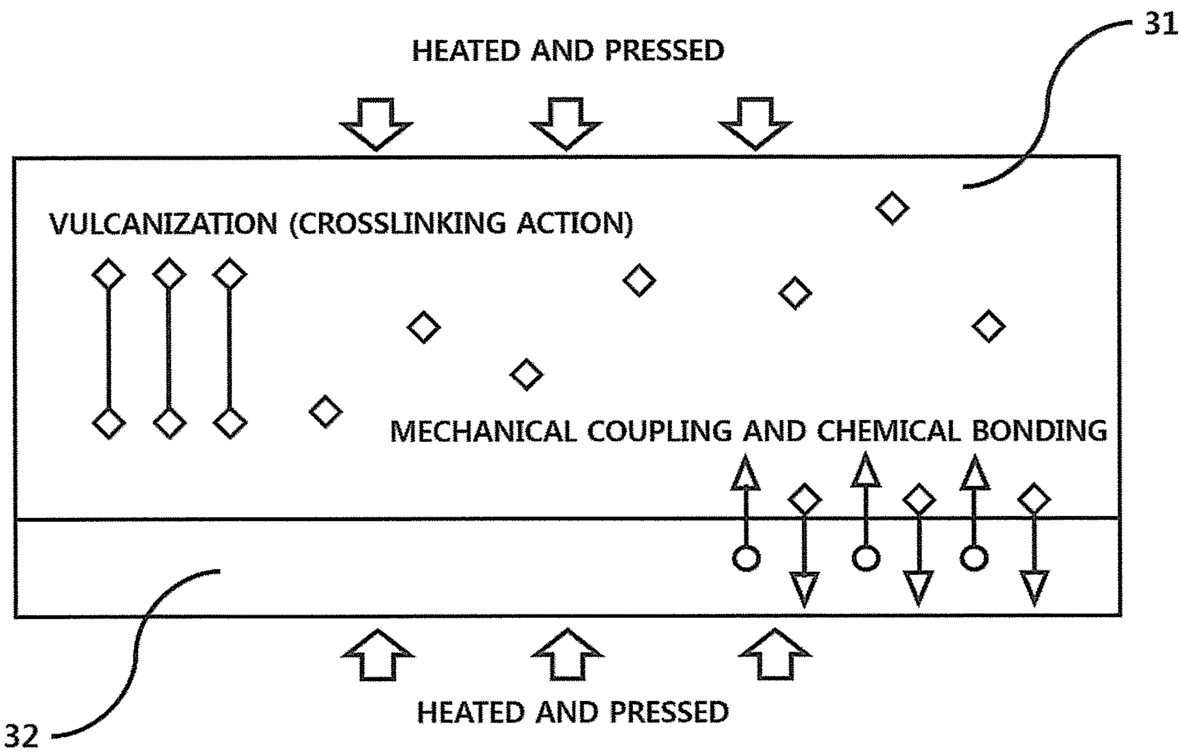
FIG. 5B is a view for describing the manufacture of the sleeper pad illustrated in FIG. 5A.
Figure 6A:
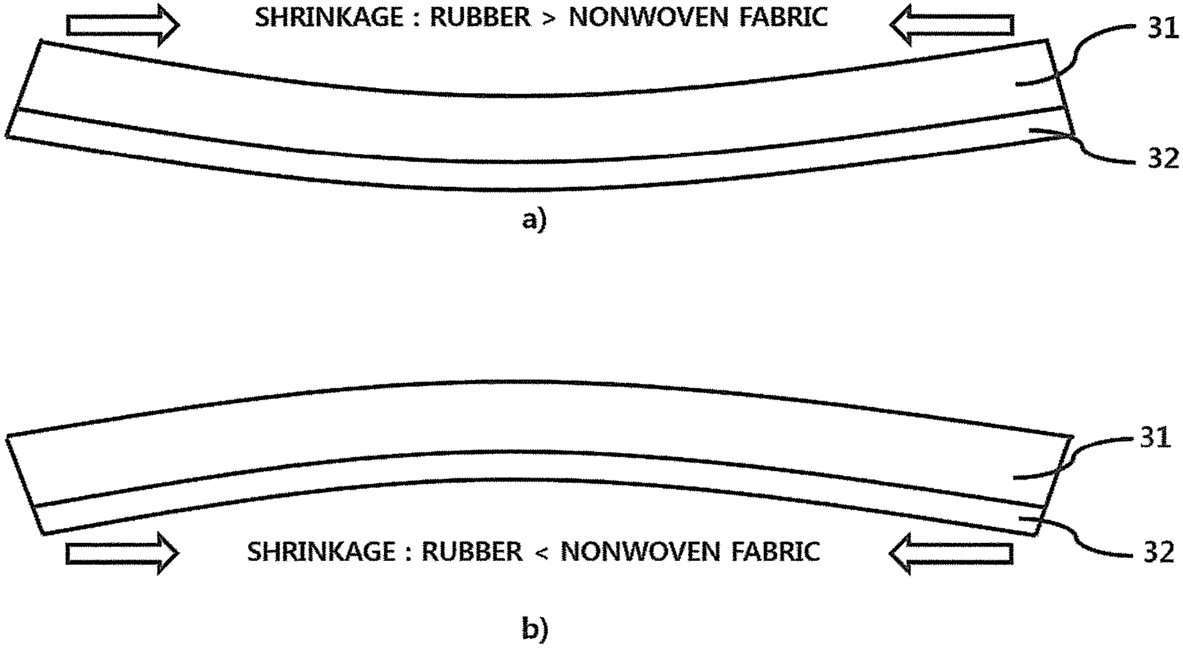
FIG. 6A is a view for describing bending of a rubber pad that is caused by a difference in stiffness between rubber and nonwoven fabric in the sleeper pad using the rubber pad integrated with the nonwoven fabric according to the related art.
Figure 6B:
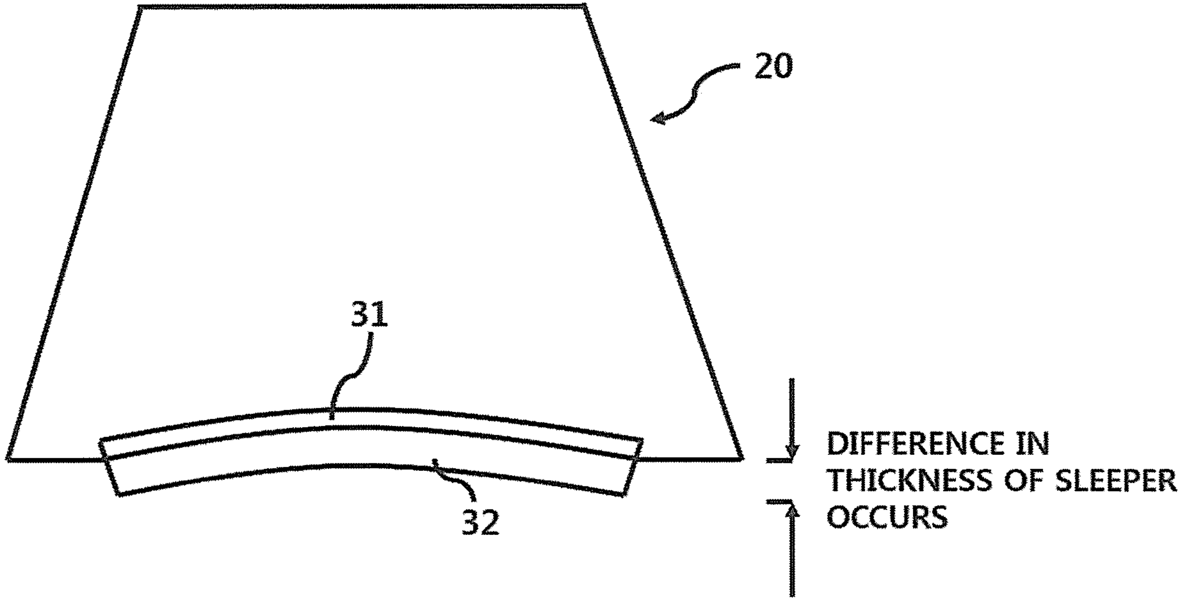
FIG. 6B is a view for describing a case in which the sleeper quality is degraded due to a rubber pad with low flatness in the sleeper pad using the rubber pad integrated with the nonwoven fabric according to the related art.

Hereinafter, embodiments of the present disclosure will be described in detail with reference to the accompanying drawings to allow those of ordinary skill in the art to which the present disclosure pertains to easily carry out the embodiments of the present disclosure. The present disclosure may be implemented in various different forms and is not limited to the embodiments described herein. In the drawings, parts unrelated to the description are omitted for clarity of the present disclosure, and like elements are denoted by like reference numerals throughout.

Throughout the specification, when a certain part is described as "including" a certain element, this signifies that the certain part may further include another element rather than excluding the other element unless particularly described otherwise.

[Nonwoven Fabric-Integrated Sleeper Pad 100 Using Rubber Pad Embedded with Stiffener]

Figure 7:
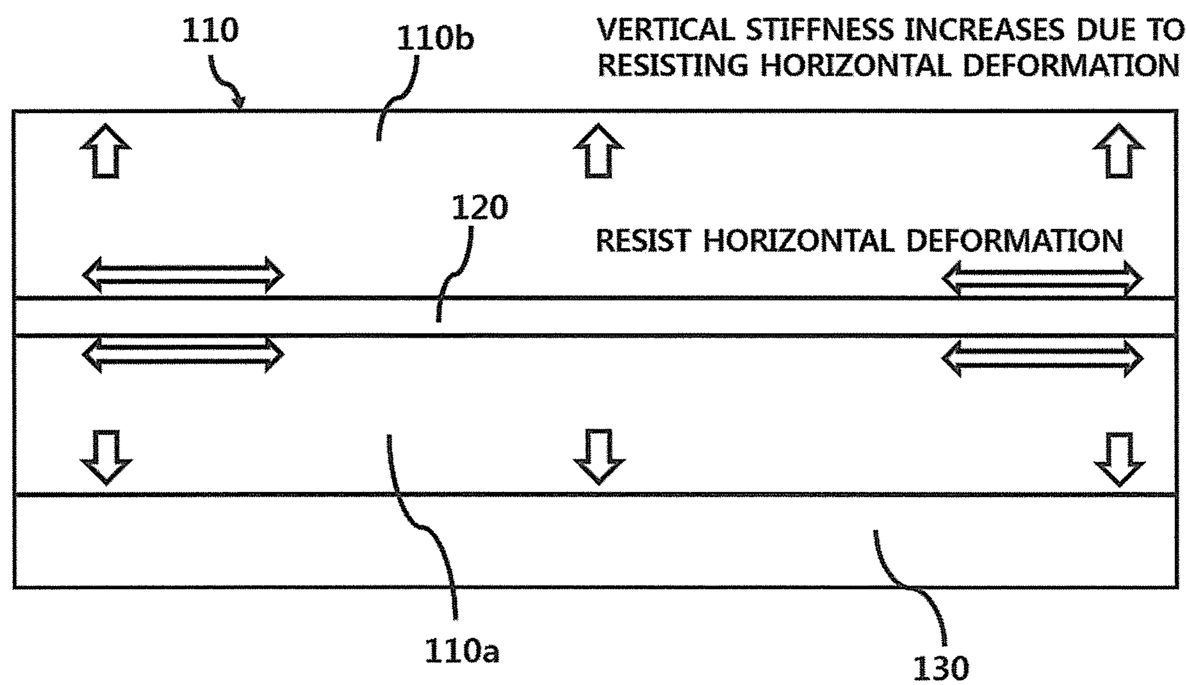
FIG. 7 is a cross-sectional view illustrating a nonwoven fabric-integrated sleeper pad using a rubber pad embedded with a stiffener according to an embodiment of the present disclosure.

FIG. 7 is a cross-sectional view illustrating a nonwoven fabric-integrated sleeper pad using a rubber pad embedded with a stiffener according to an embodiment of the present disclosure.

Referring to FIG. 7, a nonwoven fabric-integrated sleeper pad 100 using a rubber pad embedded with a stiffener according to an embodiment of the present disclosure includes a rubber pad 110, a stiffener 120, and an attaching nonwoven fabric 130, and the rubber pad 110 includes a lower rubber pad 110*a* and an upper rubber pad 110*b*.

The rubber pad 110 is formed of multiple layers including the lower rubber pad 110*a* and the upper rubber pad 110*b*, is integrated with the attaching nonwoven fabric 130, and is exposed to a bottom surface of a concrete sleeper 200.

The rubber pad 110 may be attached to a lower portion of the concrete sleeper and reduce load and stress acting between the concrete sleeper and gravel. In this way, the rubber pad 110 may increase service life of sleeper gravel and the concrete sleeper.

The stiffener 120, which is a pad stiffener embedded in a middle of the rubber pad 110, resists deformation, such as shrinkage of the rubber pad 110 that occurs during curing of the concrete sleeper, to minimize an occurrence of bending due to unequal deformation between the attaching nonwoven fabric 130 and the rubber pad 110 and serves to adjust vertical support stiffness of the sleeper pad 100.

By being formed in a lattice shape, the stiffener 120 can resist deformation of the rubber pad in both horizontal and vertical directions, and here, a material having higher stiffness than rubber may be used.

For example, the stiffener 120 may be formed of a lattice-shaped glass fiber and may be provided as one or more stiffeners 120 horizontally disposed in the middle of the rubber pad 110.

Also, the stiffener 120 may be horizontally mounted on an upper portion of the lower rubber pad 110*a* of the rubber pad 110 and may be adhered using an adhesive.

The attaching nonwoven fabric 130 comes in close contact with a bottom surface of the lower rubber pad 110*a* of the rubber pad 110 and is embedded in a bottom surface of the concrete sleeper 20.

The attaching nonwoven fabric 130 is a nonwoven fabric which has a thickness around 3 mm and is attached to rubber by a thermal fusion process during manufacture of the rubber pad 110. The attaching nonwoven fabric 130 serves to absorb cement paste placed during manufacture of a sleeper pad-integrated concrete sleeper and attach a rubber pad to a concrete sleeper in a curing process.

Specifically, the attaching nonwoven fabric 130 may be embedded by being pressed toward a surface of concrete C placed in a sleeper formwork, and as the placed concrete C is cured, the nonwoven fabric-integrated sleeper pad 100 is embedded in the bottom surface of the concrete sleeper 200 to secure an attaching force with the concrete sleeper 200.

Accordingly, the stiffener 120 can resist horizontal deformation of the rubber pad 110 to increase vertical stiffness.

Specifically, in a case of the nonwoven fabric-integrated sleeper pad 100 using the rubber pad embedded with the stiffener according to an embodiment of the present disclosure, the stiffener 120 made of a glass fiber material and formed in the shape of a lattice is inserted in the middle of the rubber pad 110 to constitute the sleeper pad having a multilayer structure. The sleeper pad 100 having the multilayer structure can suppress bending deformation caused by a difference in shrinkage between the attaching nonwoven fabric 130 and the rubber pad 110 by a resisting effect due to the material and shape of the stiffener 120 whose stiffness is higher than rubber. In this way, the flatness of the steeper pad 100 can be increased, and vertical stiffness can be increased by resisting horizontal deformation.

Figure 8:
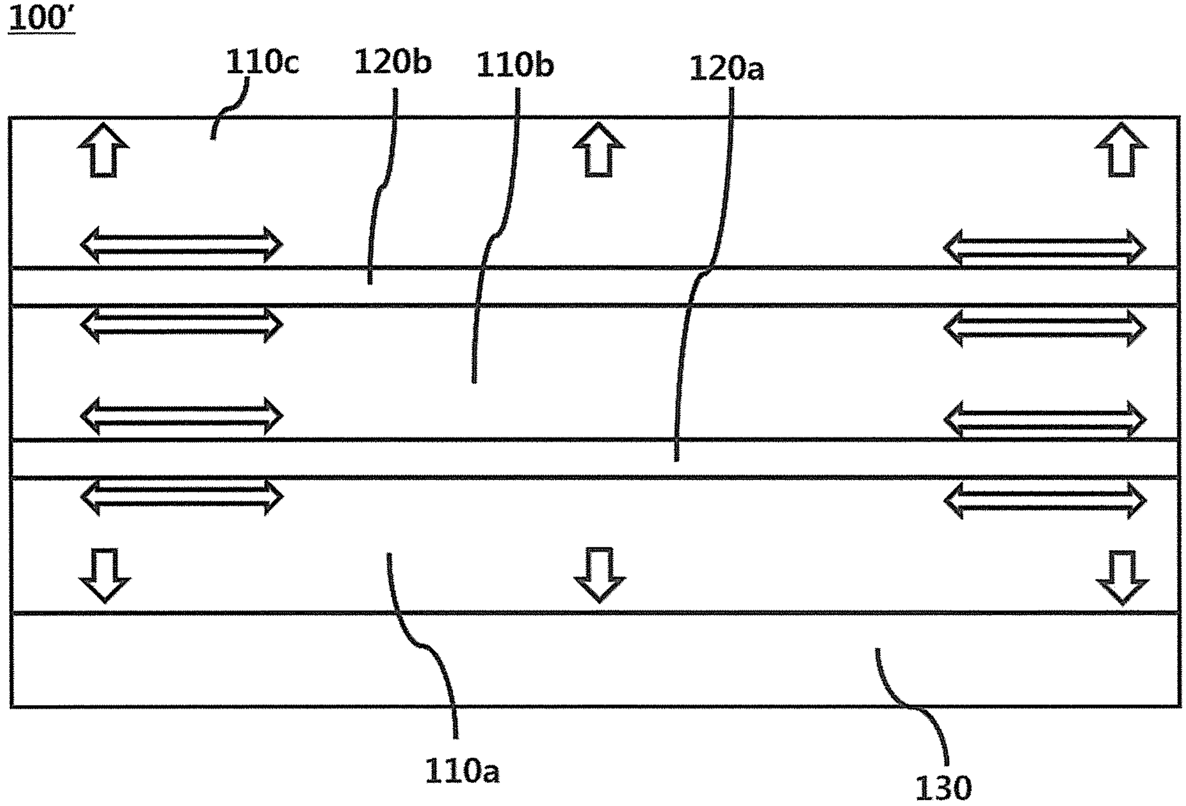
FIG. 8 is a cross-sectional view illustrating a case in which multiple layers of stiffeners are embedded in the rubber pad in the nonwoven fabric-integrated sleeper pad using the rubber pad embedded with the stiffener according to an embodiment of the present disclosure.
Figure 9:
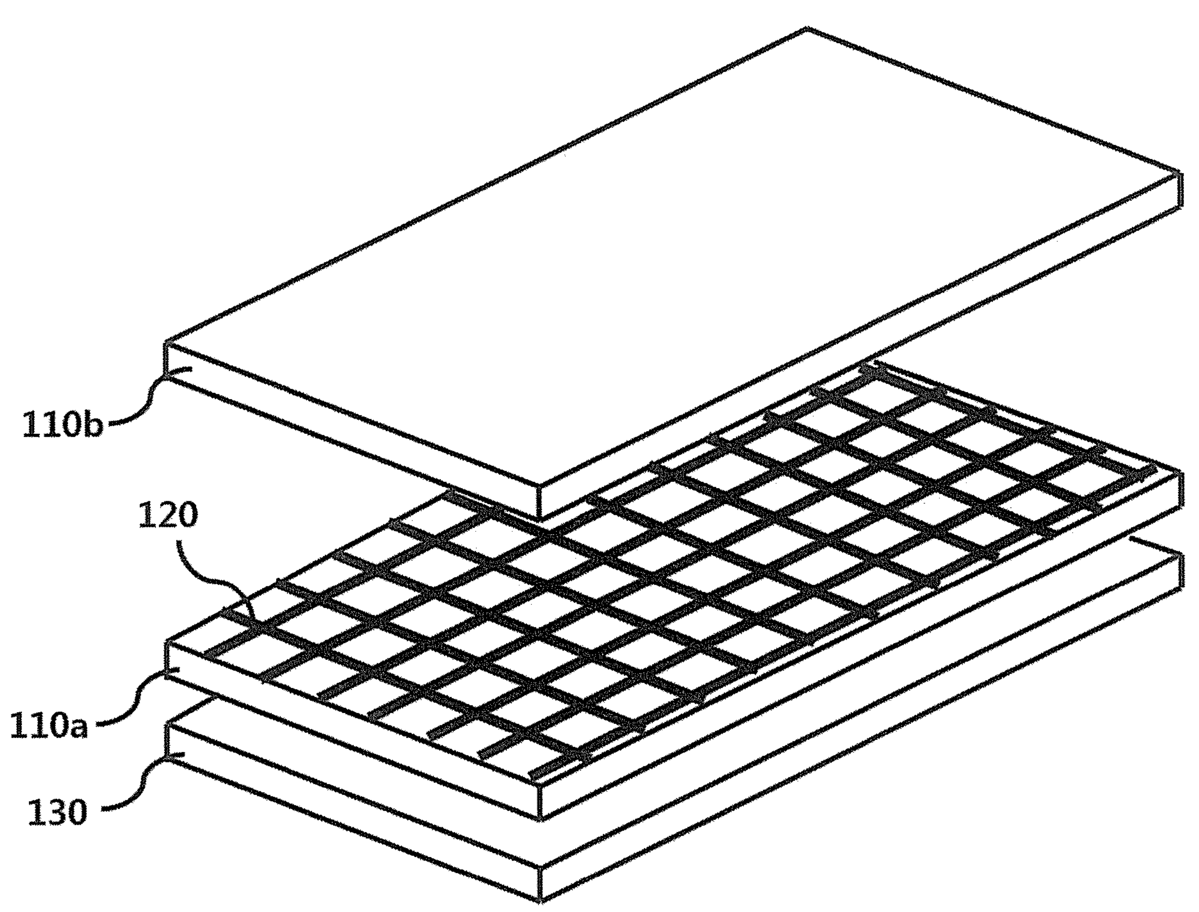
FIG. 9 is a perspective view illustrating the manufacture of the nonwoven fabric-integrated sleeper pad using the rubber pad embedded with the stiffener according to an embodiment of the present disclosure.

Meanwhile, FIG. 8 is a cross-sectional view illustrating a case in which multiple layers of stiffeners are embedded in the rubber pad in the nonwoven fabric-integrated sleeper pad using the rubber pad embedded with the stiffener according to an embodiment of the present disclosure, and FIG. 9 is a perspective view illustrating the manufacture of the nonwoven fabric-integrated sleeper pad using the rubber pad embedded with the stiffener according to an embodiment of the present disclosure.

The nonwoven fabric-integrated sleeper pad using the rubber pad embedded with the stiffener according to an embodiment of the present disclosure may be a nonwoven fabric-integrated sleeper pad 100' in which multiple layers of stiffeners 120*a* and 120*b* are embedded in a rubber pad 110 as illustrated in FIG. 8. Here, the rubber pad 110 may be formed of multiple layers of rubber pads 110*a*, 110*b*, and 110*c*.

That is, by repeatedly applying the stiffener 120 and the rubber pad 110, in a case in which it is necessary to adjust vertical support stiffness in various ranges of the sleeper pad 100, the stiffener 120 may be additionally disposed in a middle at least once or more.

In the case of the nonwoven fabric-integrated sleeper pad 100 using the rubber pad embedded with the stiffener according to an embodiment of the present disclosure, as illustrated in FIG. 9, in a state in which the stiffener 120 is horizontally embedded between the lower rubber pad 110*a* and the upper rubber pad 110*b*, the lower rubber pad 110*a* and the upper rubber pad 110*b* are adhered to each other by a thermal fusion process.

That is, a thin lattice-shaped glass fiber portion is combined with the lower rubber pad 110*a* by an adhesive, and in a space between the lattice-shaped stiffeners in the middle, the upper rubber pad 110*b* and the lower rubber pad 110*a* are fused by heat and pressure, and thus the stiffeners 120 are embedded and combined between the upper rubber pad 110*b* and the lower rubber pad 110*a*.

Specifically, the rubber pad 110 may include: the lower rubber pad 110*a* having a bottom surface with which the attaching nonwoven fabric 130 comes in close contact and an upper surface on which the stiffener 120 is mounted; and the upper rubber pad 110*b* adhered to the lower rubber pad 110*a* by a thermal fusion process, wherein the upper rubber pad 110*b* may be provided as one or more upper rubber pads 110*b* which are sequentially stacked, and the rubber pad 110 may be formed of multiple layers.

Specifically, in a process in which the lower rubber pad 110*a* in close contact with the attaching nonwoven fabric 130 is heated and pressed, the attaching nonwoven fabric 130 and the lower rubber pad 110*a* are entangled on a close contact surface, thus coming in close contact and being mechanically coupled, and are chemically bonded as the close contact surface between the attaching nonwoven fabric 130 and the lower rubber pad 110*a* is melted and diffused due to vulcanization, thus allowing the attaching nonwoven fabric 130 to be integrated with the bottom surface of the lower rubber pad 110*a*.

Also, as will be described below, the concrete sleeper 200 in which the attaching nonwoven fabric 130 is embedded is a concrete sleeper including an intermediate connecting portion 240 disposed between expansion flanges 230 at both ends. The nonwoven fabric-integrated sleeper pad 100 which is exposed only to bottom surfaces of the expansion flanges 230 at both ends comes in contact with gravel 220.

Here, the attaching nonwoven fabric 130 may be embedded in a surface of concrete using a pressing plate 210 so that the nonwoven fabric-integrated sleeper pad 100 can be set with an equivalent pressure on the concrete C placed in the sleeper formwork, and in a process in which the concrete C for manufacturing the concrete sleeper 200 is cured, the nonwoven fabric-integrated sleeper pad 100 may be attached to the bottom surface of the concrete sleeper 200.

Also, for the nonwoven fabric-integrated sleeper pad 100, the rubber pad 110 may be cut to be apart from an end of the concrete sleeper 200, the nonwoven fabric-integrated sleeper pad 100 may be attached only to a portion where a load is intensively transmitted by a rail, and by performing rounding treatment R on a corner portion 140 of the nonwoven fabric-integrated sleeper pad 100, an attaching force with the concrete sleeper 200 can be secured.

Also, for the rubber pad 110, an ethylene propylene diene monomer (EPDM) compounded rubber may be formed into a thin sheet plate, and the rubber pad 110 may be integrated with the attaching nonwoven fabric 130 having a surface made of a dense material and may be used as the nonwoven fabric-integrated sleeper pad 100.

Figure 10A:
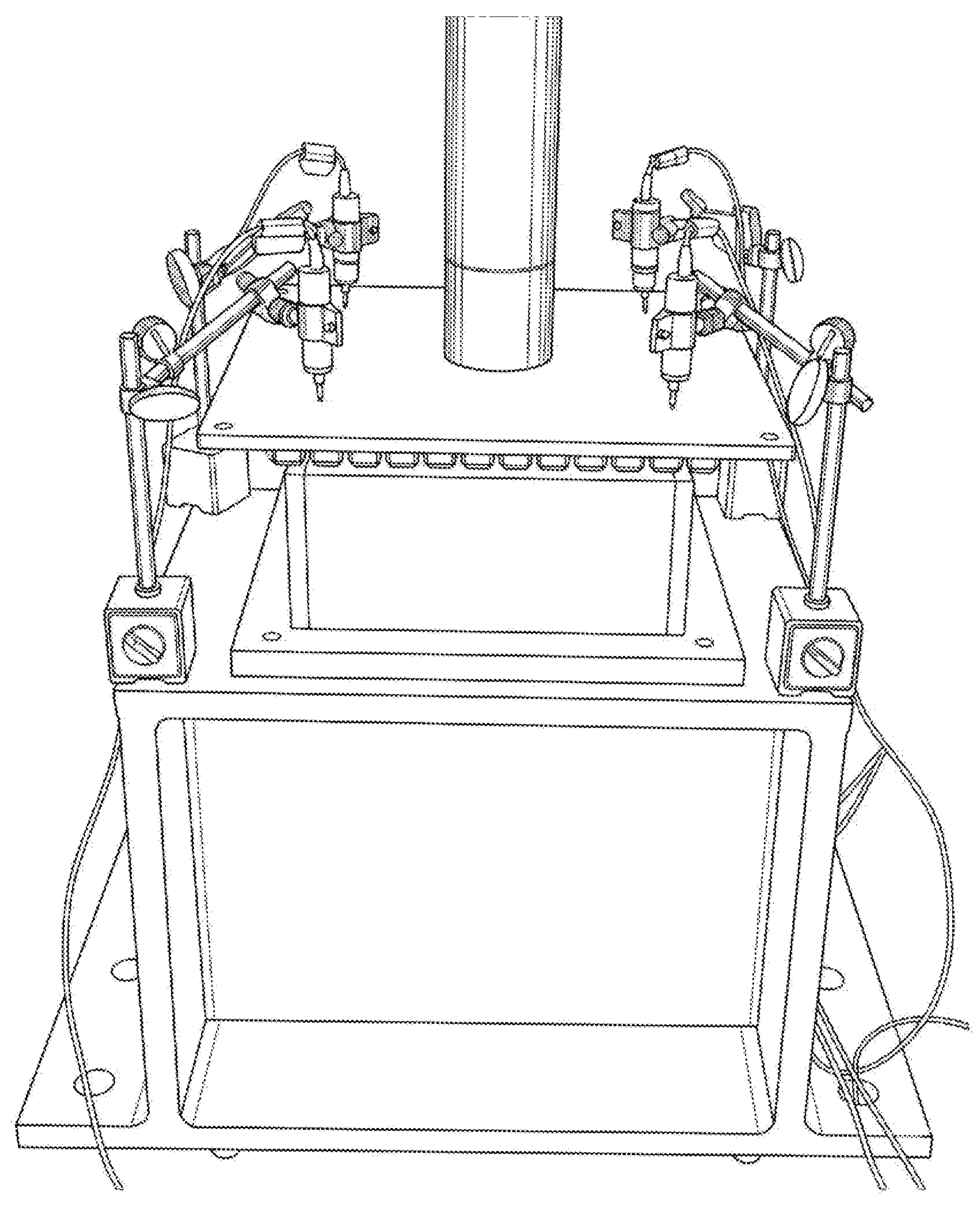
FIG. 10A is a panoramic picture of a vertical stiffness test of the nonwoven fabric-integrated sleeper pad using the rubber pad embedded with the stiffener according to an embodiment of the present disclosure.
Figure 10B:
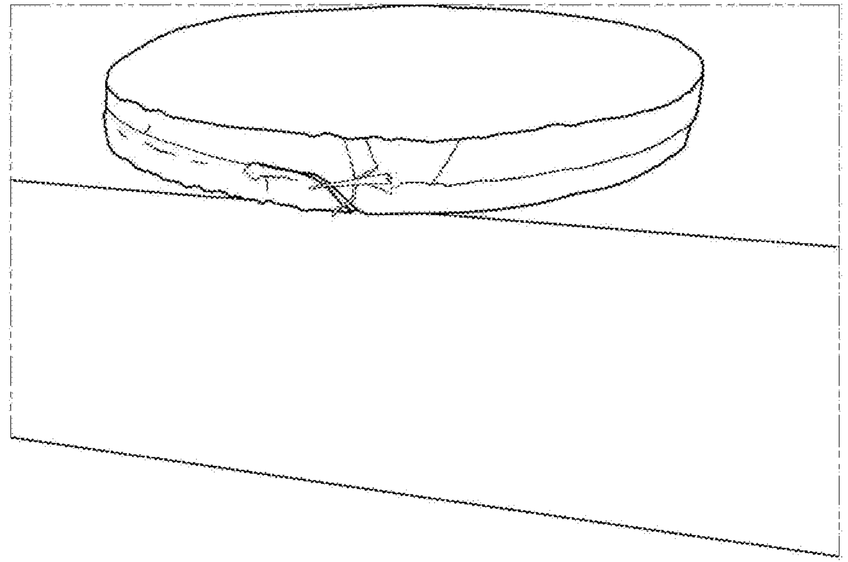
FIG. 10B is a picture of a test piece for the vertical stiffness test.
Figure 10C:
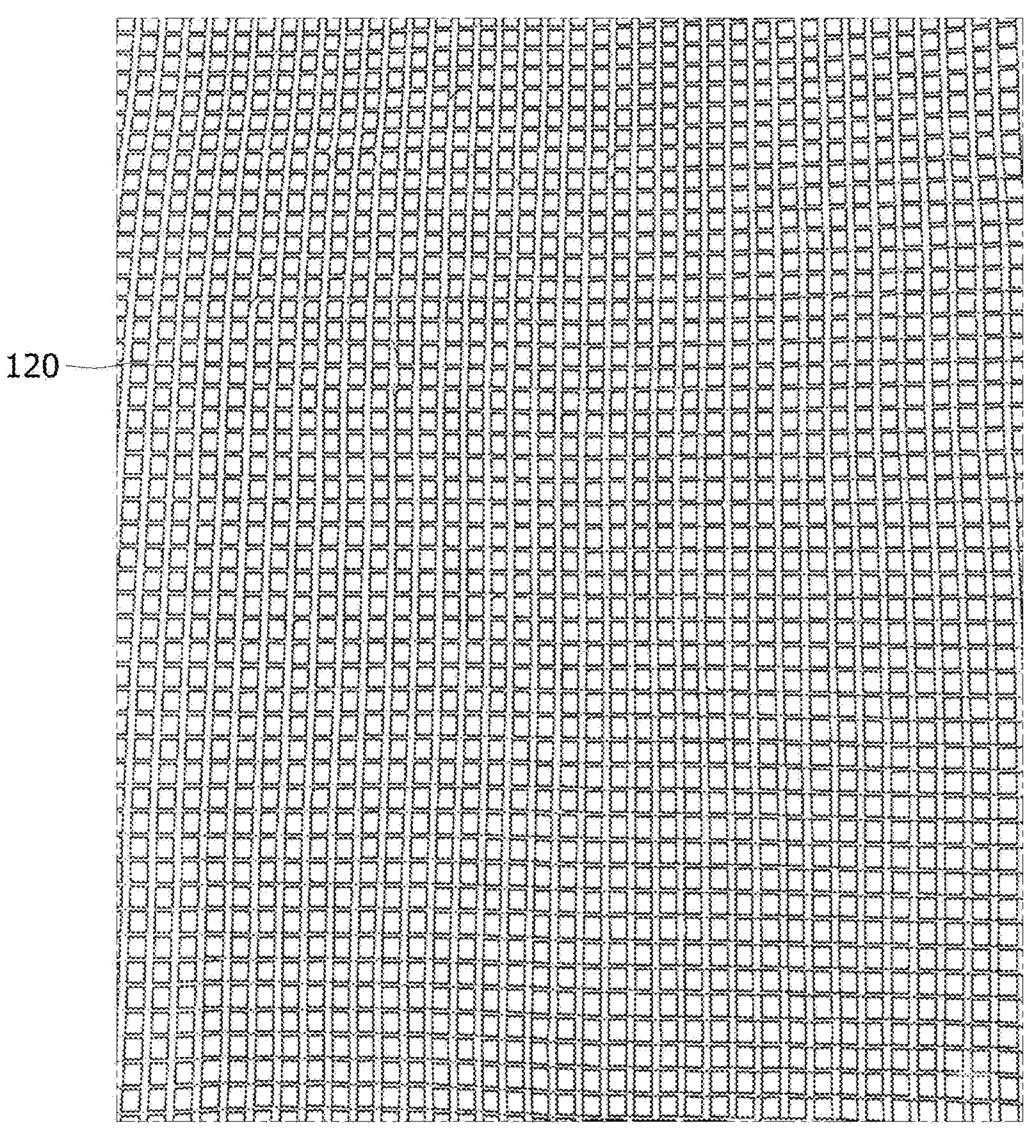
FIG. 10C is a picture illustrating an example of a lattice-shaped stiffener embedded in the rubber pad.

Meanwhile, FIG. 10A is a panoramic picture of a vertical stiffness test of the nonwoven fabric-integrated sleeper pad using the rubber pad embedded with the stiffener according to an embodiment of the present disclosure, FIG. 10B is a picture of a test piece for the vertical stiffness test, FIG. 10C is a picture illustrating an example of a lattice-shaped stiffener embedded in the rubber pad, and FIG. 11 is a view illustrating results of the vertical stiffness test of the nonwoven fabric-integrated sleeper pad using the rubber pad embedded with the stiffener according to an embodiment of the present disclosure.

In the case of the nonwoven fabric-integrated sleeper pad 100 using the rubber pad embedded with the stiffener according to an embodiment of the present disclosure, a vertical stiffness test of the nonwoven fabric-integrated sleeper pad may be performed using equipment illustrated in FIG. 10A. Here, a test piece illustrated in FIG. 10B is manufactured to perform the vertical stiffness test. Here, as illustrated in FIG. 10C, the lattice-shaped stiffener 120 may be embedded in the rubber pad.

As illustrated in FIG. 11, according to results of the vertical stiffness test of the nonwoven fabric-integrated sleeper pad using the rubber pad embedded with the stiffener according to an embodiment of the present disclosure, through static and dynamic vertical support stiffness evaluation tests, it can be confirmed that the vertical stiffness of the sleeper pad 100 is adjusted by the stiffener 120 embedded in the middle.

Also, through a fatigue test of the rubber pad material, resistance to degradation and durability can be confirmed. For example, as a result of the fatigue test for 1,000 hours at a temperature in a range of 100 to 150° C., it can be confirmed that a change rate of physical properties is within 30% (or elongation is 50% or less and elasticity is less than 200% based on the service life of rubber).

[Method of Manufacturing Nonwoven Fabric-Integrated Sleeper Pad Using Rubber Pad Embedded with Stiffener]

Figure 12:
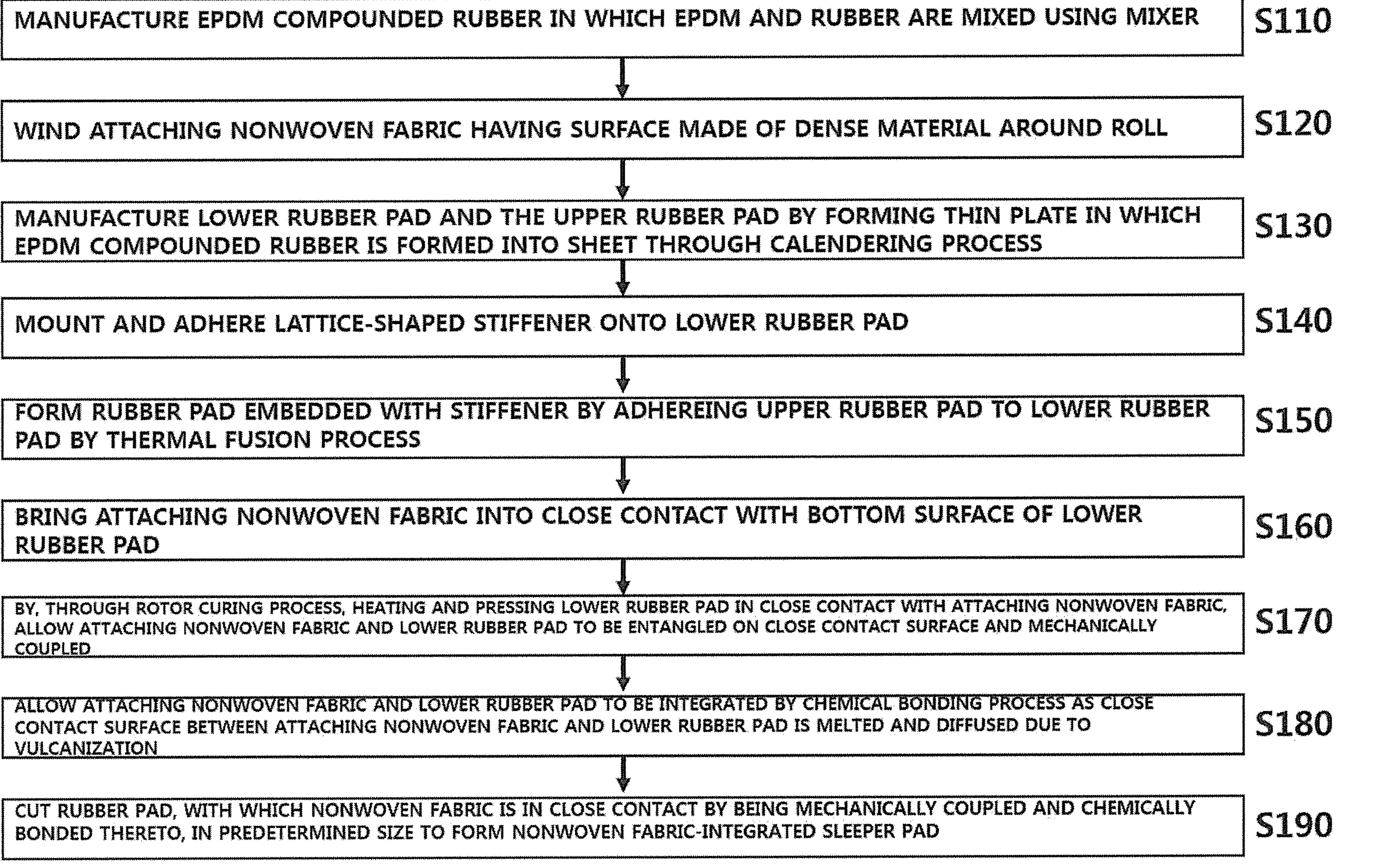
FIG. 12 is an operational flowchart illustrating a method of manufacturing the nonwoven fabric-integrated sleeper pad using the rubber pad embedded with the stiffener according to an embodiment of the present disclosure.
Figure 13:
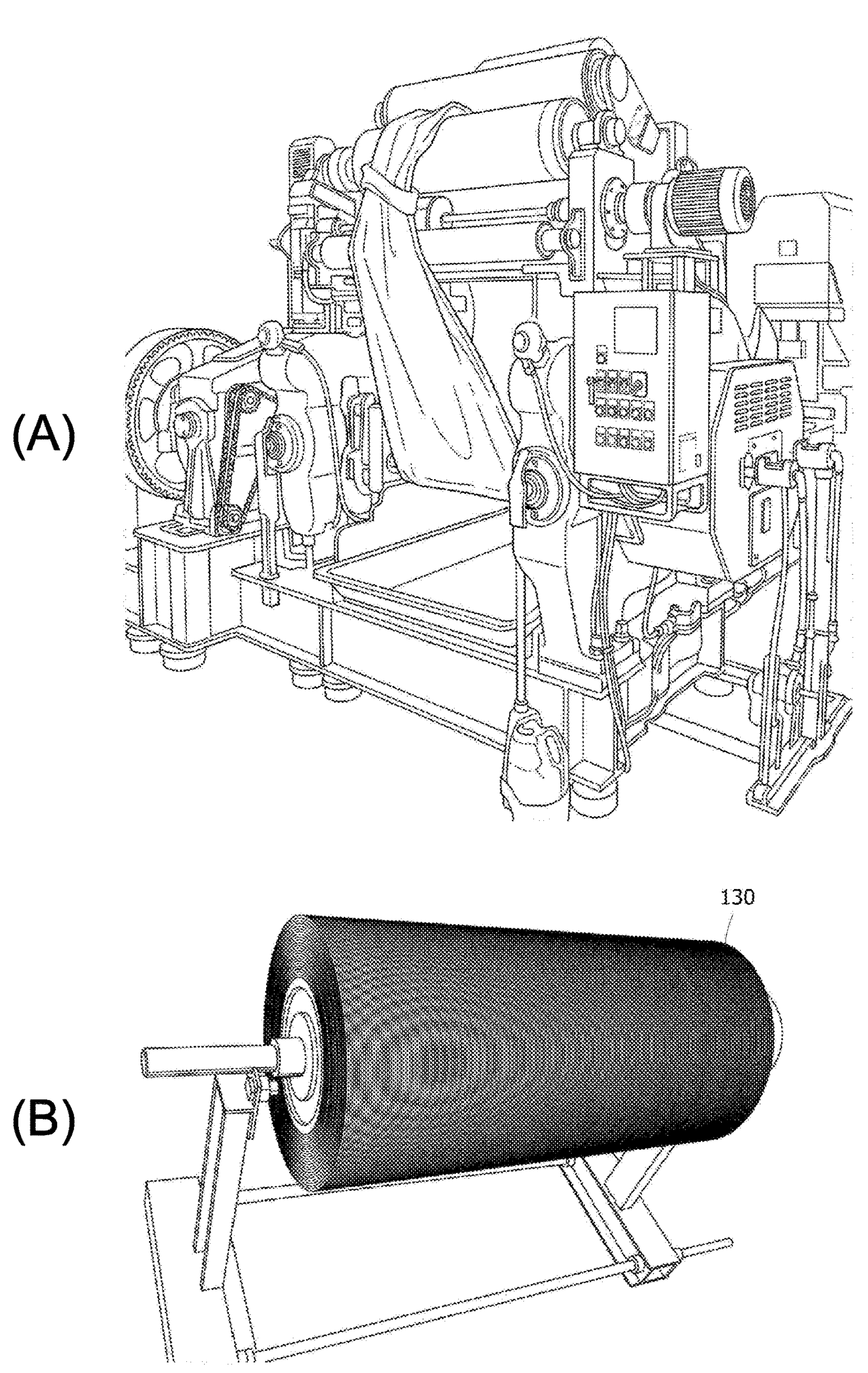
FIG. 13 shows pictures of a manufacturing apparatus for manufacturing the nonwoven fabric-integrated sleeper pad using the rubber pad embedded with the stiffener according to an embodiment of the present disclosure.
Figure 14:
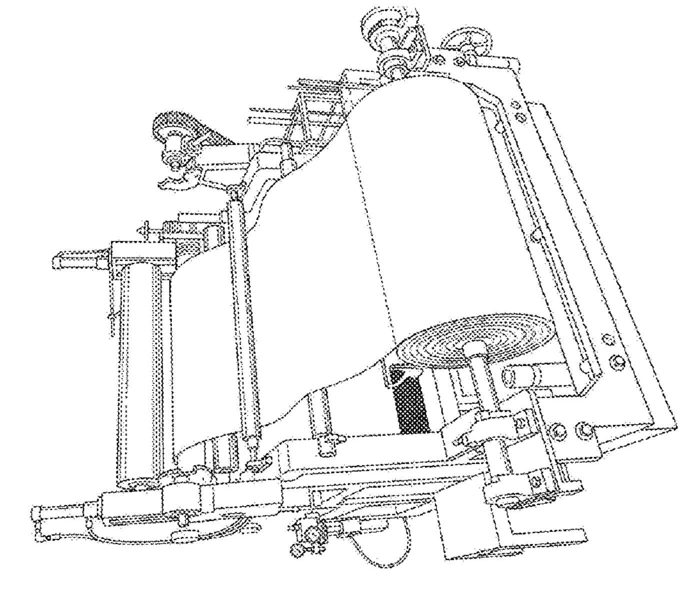
FIG. 14 shows pictures showing in detail the manufacture of the nonwoven fabric-integrated sleeper pad using the rubber pad embedded with the stiffener according to an embodiment of the present disclosure.
Figure 14:
Figure 14:
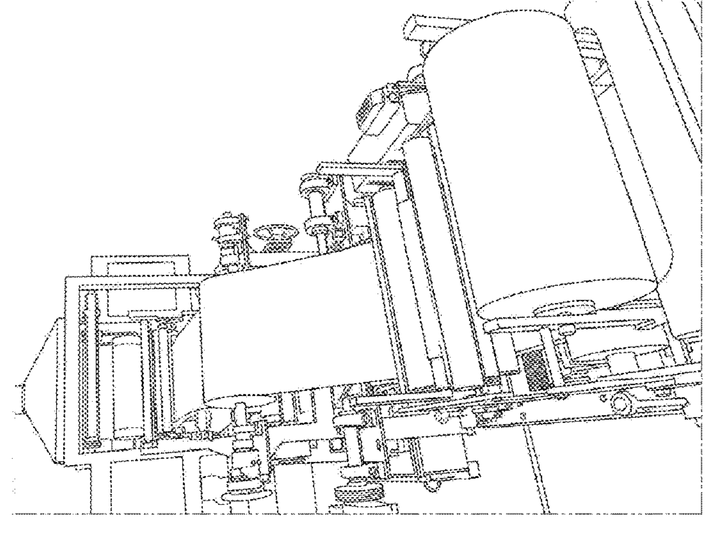
Figure 14:
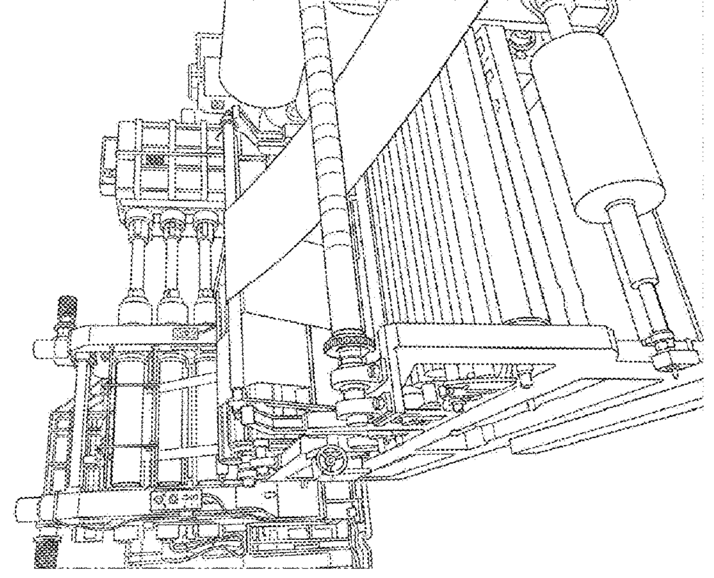

FIG. 12 is an operational flowchart illustrating a method of manufacturing the nonwoven fabric-integrated sleeper pad using the rubber pad embedded with the stiffener according to an embodiment of the present disclosure, FIG. 13 shows pictures of a manufacturing apparatus for manufacturing the nonwoven fabric-integrated sleeper pad using the rubber pad embedded with the stiffener according to an embodiment of the present disclosure, and FIG. 14 shows pictures showing in detail the manufacture of the nonwoven fabric-integrated sleeper pad using the rubber pad embedded with the stiffener according to an embodiment of the present disclosure.

Referring to FIGS. 12 to 14, in the method of manufacturing the nonwoven fabric-integrated sleeper pad using the rubber pad embedded with the stiffener according to an embodiment of the present disclosure, ethylene propylene diene monomer (EPDM) compounded rubber in which EPDM and rubber are mixed is manufactured using a mixer (S110).

Next, the attaching nonwoven fabric 130 having a surface made of a dense material is wound around a roll (S120).

Next, the lower rubber pad 110*a* and the upper rubber pad 110*b* are manufactured by forming a thin plate in which the EPDM compounded rubber is formed into a sheet through a calendering process (S130).

Here, using the manufacturing apparatus illustrated in a) of FIG. 13, the rubber pad 110 with which the attaching nonwoven fabric 130 illustrated in b) of FIG. 13 comes in close contact may be manufactured.

Next, the lattice-shaped stiffener 120 is mounted and adhered onto the lower rubber pad 110*a* (S140).

Here, the stiffener 120 is horizontally embedded in the rubber pad 110 to resist horizontal deformation of the rubber pad 110 and increase vertical stiffness.

Also, the stiffener 120 is formed of a lattice-shaped glass fiber and is provided as one or more stiffeners 120 horizontally disposed in the middle of the rubber pad 110. For example, the stiffener 120 is horizontally mounted on an upper portion of the lower rubber pad 110*a* of the rubber pad 110 and is adhered using an adhesive.

Next, the rubber pad 110 embedded with the stiffener 120 is formed by adhering the upper rubber pad 110*b* to the lower rubber pad 110*a* by a thermal fusion process (S150).

Here, in a state in which the stiffener 120 is horizontally embedded between the lower rubber pad 110*a* and the upper rubber pad 110*b*, the lower rubber pad 110*a* and the upper rubber pad 110*b* are adhered to each other by a thermal fusion process.

Next, the attaching nonwoven fabric 130 is brought into close contact with the bottom surface of the rubber pad 110 embedded with the stiffener (S160).

Here, the attaching nonwoven fabric 130 may be embedded by being pressed toward a surface of concrete C placed in a sleeper formwork, and as the placed concrete C is cured, the nonwoven fabric-integrated sleeper pad 100 is embedded in the bottom surface of the concrete sleeper 200 to secure an attaching force with the concrete sleeper 200.

For example, as illustrated in a) of FIG. 14, the attaching nonwoven fabric 130 may be brought into close contact with the bottom surface of the rubber pad 110.

Next, as illustrated in b) of FIG. 14, by, through a rotor curing process, heating and pressing the lower rubber pad 110*a* in close contact with the attaching nonwoven fabric 130, the attaching nonwoven fabric 130 and the lower rubber pad 110*a* are allowed to be entangled on a close contact surface and mechanically coupled (S170).

Here, before performing step S170, the attaching nonwoven fabric 130 may be embedded in a surface of concrete using the pressing plate 210 so that the nonwoven fabric-integrated sleeper pad 100 is able to be set with an equivalent pressure on the concrete C placed in the sleeper formwork.

Next, the attaching nonwoven fabric 130 and the lower rubber pad 110*a* are allowed to be integrated by a chemical bonding process as the close contact surface between the attaching nonwoven fabric 130 and the lower rubber pad

110*a* is melted and diffused due to vulcanization (S180). For example, as illustrated in c) of FIG. 14, the nonwoven fabric-integrated sleeper pad 100 may be formed by a mechanical coupling process and a chemical bonding process.

Next, the rubber pad 110, with which the nonwoven fabric is in close contact by being mechanically coupled and chemically bonded thereto, is cut in a predetermined size to form the nonwoven fabric-integrated sleeper pad 100 (S190).

Consequently, according to an embodiment of the present disclosure, in a sleeper pad for railroad sleepers in which a nonwoven fabric is attached to a rubber pad by a thermal fusion process, vertical support stiffness of the rubber pad can be adjusted by the stiffener embedded in the middle of the rubber pad, and the flatness of the rubber pad can be secured by resisting bending deformation due to a difference in shrinkage between rubber and nonwoven fabric.

[Method of Constructing Nonwoven Fabric-Integrated Sleeper Pad Using Rubber Pad Embedded with Stiffener]

Figure 15:
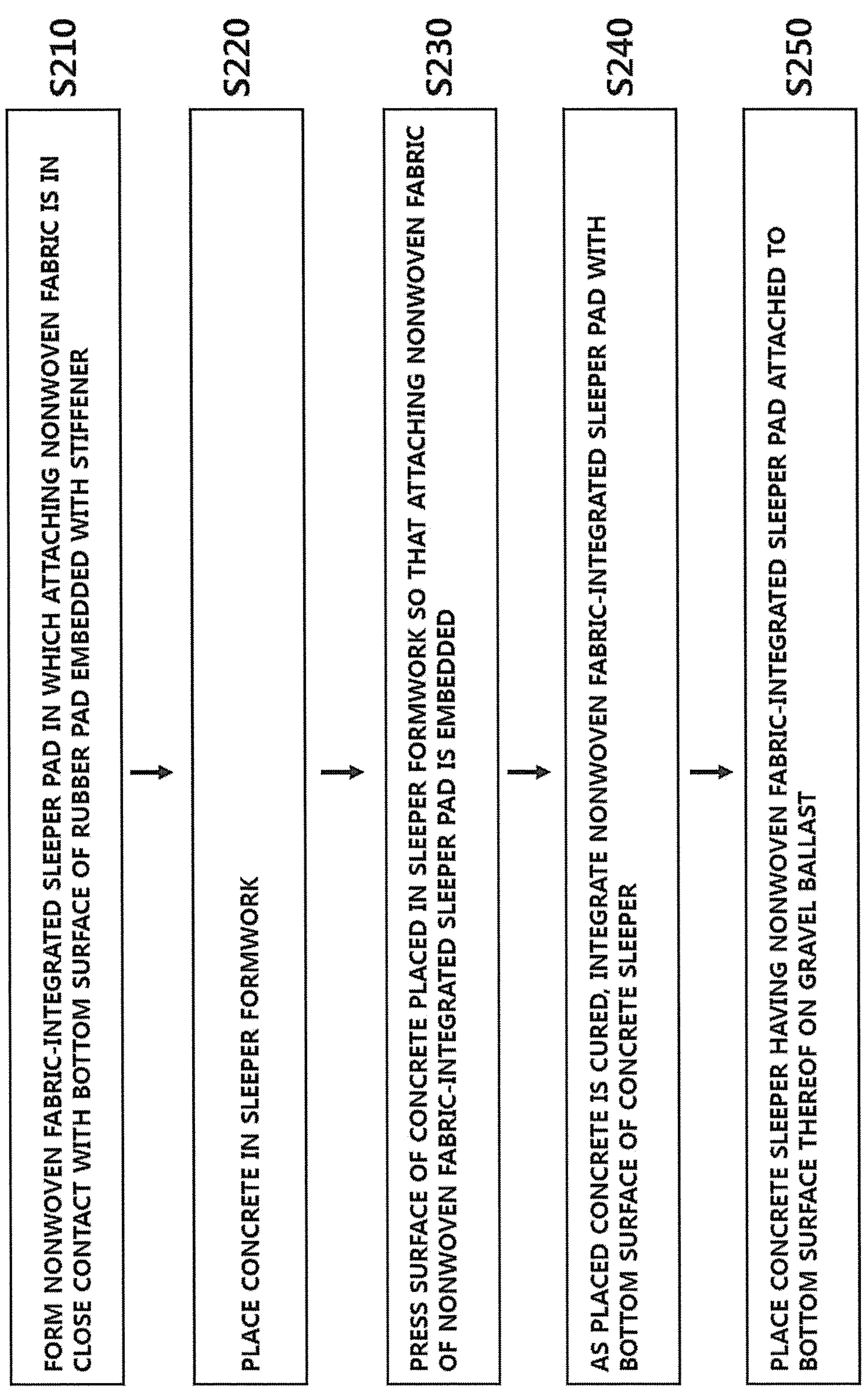
FIG. 15 is an operational flowchart illustrating a method of constructing the nonwoven fabric-integrated sleeper pad using the rubber pad embedded with the stiffener according to an embodiment of the present disclosure.

FIG. 15 is an operational flowchart illustrating a method of constructing the nonwoven fabric-integrated sleeper pad using the rubber pad embedded with the stiffener according to an embodiment of the present disclosure.

Referring to FIG. 15, in the method of constructing the nonwoven fabric-integrated sleeper pad using the rubber pad embedded with the stiffener according to an embodiment of the present disclosure, the nonwoven fabric-integrated sleeper pad 100 in which the attaching nonwoven fabric 130 is in close contact with a bottom surface of the rubber pad 110 embedded with the stiffener 120 is formed (S210). Here, the stiffener 120 is horizontally embedded in the rubber pad 110 to resist horizontal deformation of the rubber pad 110 and increase vertical stiffness.

Also, the attaching nonwoven fabric 130 may be embedded by being pressed toward a surface of concrete C placed in a sleeper formwork, and as the placed concrete C is cured, the nonwoven fabric-integrated sleeper pad 100 is embedded in the bottom surface of the concrete sleeper 200 to secure an attaching force with the concrete sleeper 200.

Specifically, the rubber pad 110 is formed of multiple layers including the lower rubber pad 110*a* and the upper rubber pad 110*b*, is integrated with the attaching nonwoven fabric 130, and is exposed to the bottom surface of the concrete sleeper 200.

Also, the stiffener 120 is formed of a lattice-shaped glass fiber and is horizontally mounted on an upper portion of the lower rubber pad 110*a* of the rubber pad 110 and adhered using an adhesive. Also, in a state in which the stiffener 120 is horizontally embedded between the lower rubber pad 110*a* and the upper rubber pad 110*b*, the lower rubber pad 110*a* and the upper rubber pad 110*b* are adhered to each other by a thermal fusion process.

Also, in a process in which the lower rubber pad 110*a* in close contact with the attaching nonwoven fabric 130 is heated and pressed, the attaching nonwoven fabric 130 and the lower rubber pad 110*a* are allowed to be entangled on a close contact surface and mechanically coupled, and by the attaching nonwoven fabric 130 and the lower rubber pad 110*a* being chemically bonded as the close contact surface between the attaching nonwoven fabric 130 and the lower rubber pad 110*a* is melted and diffused by vulcanization, the attaching nonwoven fabric 130 is integrated with the bottom surface of the lower rubber pad 110*a*. Here, the attaching nonwoven fabric 130 is embedded in a surface of concrete using the pressing plate 210 so that the nonwoven fabric-integrated sleeper pad 100 is able to be set with an equivalent pressure on the concrete C placed in the sleeper formwork, and in a process in which the concrete C for manufacturing the concrete sleeper 200 is cured, the nonwoven fabric-integrated sleeper pad 100 is attached to the bottom surface of the concrete sleeper 200.

Next, concrete is placed in a sleeper formwork (S220), and then, a surface of the concrete placed in the sleeper formwork is pressed so that the attaching nonwoven fabric 130 of the nonwoven fabric-integrated sleeper pad 100 is embedded (S230).

Next, as the placed concrete is cured, the nonwoven fabric-integrated sleeper pad 100 is integrated with the bottom surface of the concrete sleeper 200 (S240).

Next, the concrete sleeper 200 having the nonwoven fabric-integrated sleeper pad 100 attached to the bottom surface thereof is placed on a gravel ballast 300 (S250).

Here, the concrete sleeper 200 having the nonwoven fabric-integrated sleeper pad 100 attached to the bottom surface thereof may be disposed on sites where new construction and maintenance and repair of a gravel ballast for railroads take place or severe settlement occurs or sites where support stiffness changes, such as a turnout or a joint.

Specifically, the nonwoven fabric-integrated sleeper pad 100 may be formed in advance to be integrated with the bottom surface of the concrete sleeper 200, and for use, the rubber pad 110 and the attaching nonwoven fabric 130 of the sleeper pad 100 may be molded in advance to each other through a mechanical coupling process and a chemical bonding process.

As described above, the sleeper pads according to the related art are attached to the bottom surface of the concrete sleeper 200 using an adhesive or attached by a fitting process or an anchor fixing process, and in response to this, the sleeper pad 100 can be manufactured to have a predetermined thickness to prevent vibrations and prevent damage due to contact with gravel.

Here, when the thickness of the sleeper pad is too large, there is a limitation in that economic feasibility cannot be secured, and since the sleeper pad becomes heavy, it is difficult to secure an attaching force with the concrete sleeper 200.

Accordingly, for the nonwoven fabric-integrated sleeper pad 100 according to an embodiment of the present disclosure, a thin plate (in the form of a thin plate material or sheet) may be used to sufficiently secure the attaching force with the concrete sleeper 200 and secure economic feasibility. However, when the attaching force with the sleeper is not sufficiently secured, the nonwoven fabric-integrated sleeper pad 100 may come in contact with the gravel 220 upon application of train load and be damaged, and when the nonwoven fabric-integrated sleeper pad 100 is attached to the concrete sleeper 200, an end of the sleeper pad 100 may be rolled, which makes it difficult to secure the attaching force at corner portions of the concrete sleeper 200 and causes formation of a vulnerable portion where the attachment performance is degraded.

Accordingly, in the case of the nonwoven fabric-integrated sleeper pad 100 according to an embodiment of the present disclosure, the sleeper pad 100 in which the attaching nonwoven fabric 130 is integrated with the bottom surface of the rubber pad 110 formed as a thin plate is used to secure economic feasibility. The nonwoven fabric-integrated sleeper pad 100 is formed to effectively secure the attaching force with the concrete sleeper 200 and compensate for the vulnerable portion where an end is rolled and the attachment performance is degraded.

More specifically, in the nonwoven fabric-integrated sleeper pad 100, due to being heated and pressed, the lower rubber pad 110*a* and the attaching nonwoven fabric 130 are entangled and come in close contact with each other to be mechanically coupled and are integrated by being chemically bonded due to vulcanization.

That is, for the rubber pad 110, EPDM compounded rubber is manufactured by mixing EPDM and rubber using a mixer, and the attaching nonwoven fabric 130 having a separate surface formed of a dense material is wound around a roll to be used.

The rubber pad 110 may be manufactured by forming the EPDM compounded rubber, which is manufactured using the mixer, into a thin sheet through a calendering process using a compressing roller and may be brought into close contact with the attaching nonwoven fabric 130. Here, the calendering process refers to a process of forming the EPDM compounded rubber into the form of a sheet through heating.

Next, the rubber pad 110, which is the EPDM compounded rubber sheet in close contact with the attaching nonwoven fabric 130, is heated and pressed through a rotor curing process. Due to such pressing, the attaching nonwoven fabric 130 and the lower rubber pad 110*a* reach a state in which they are mechanically entangled and in close contact on a close contact surface (mechanical coupling). Also, by the rubber pad 110 being heated at a temperature in a range of about 160 to 170° C. and being vulcanized (cured or sulphur-crosslinked) at a speed of 600 rpm, physical properties of the rubber pad 110 are improved by a cross-linking action, and as the attaching nonwoven fabric 130 and the rubber pad 110 are chemically bonded due to the close contact surface between the attaching nonwoven fabric 130 and the rubber pad 110 being melted and diffused, the attaching nonwoven fabric 130 and the rubber pad 110 are completely integrated with each other.

The rubber pad 110 and the attaching nonwoven fabric 130 which are integrated by being mechanically coupled and chemically bonded as described above are cut into predetermined sizes for use and are used as the nonwoven fabric-integrated sleeper pad 100 according to an embodiment of the present disclosure.

Here, the rubber pad 110 of the nonwoven fabric-integrated sleeper pad 100 may be formed to have a thickness of about 5 mm. In this way, the rubber pad 110 can have a predetermined strength, can basically transmit a load to the gravel 220 at the bottom surface of the concrete sleeper 200, and can prevent damage due to contact with the gravel 220. The attaching nonwoven fabric 130 is formed to have a thickness smaller than the thickness of the rubber pad 110.

Also, for the nonwoven fabric-integrated sleeper pad 100 to resist impact load in a high frequency range, the attaching force with the concrete sleeper 200 may be sufficiently secured. When a fixing tool such as an anchor is used as in the related art when attaching the nonwoven fabric-integrated sleeper pad 100 to the bottom surface of the concrete sleeper 200 after cutting the nonwoven fabric-integrated sleeper pad 100 into a predetermined form, it is not easy to secure the attaching force, cross-sectional loss may occur due to anchor penetration, and when an adhesive is used, it is difficult to secure the adhesive application quality. Accordingly, according to an embodiment of the present disclosure, when manufacturing the concrete sleeper 200 in factories, the nonwoven fabric-integrated sleeper pad 100 and the concrete sleeper 200 may be manufactured to be integrated in a concrete curing process.

Figure 16:
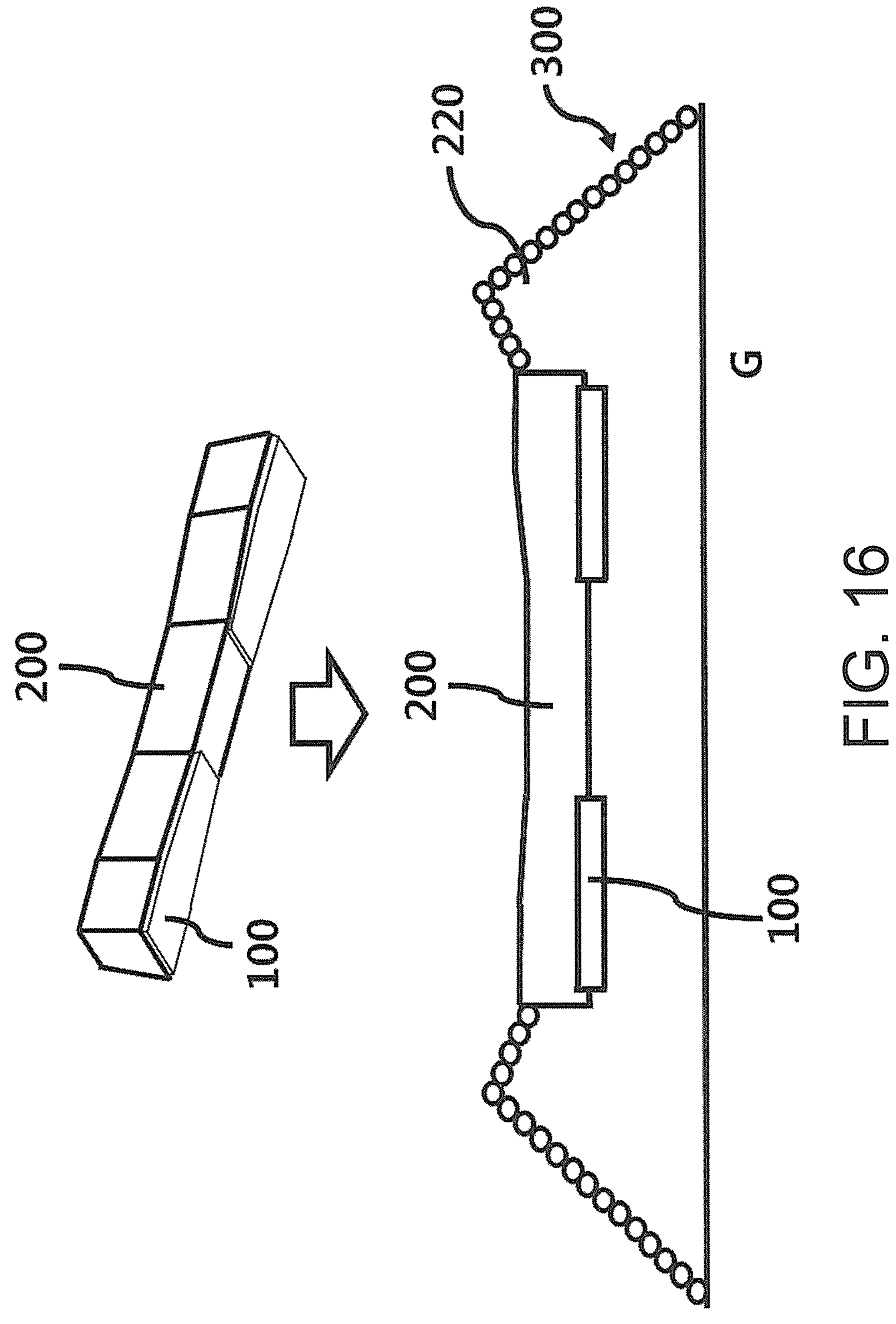
FIG. 16 is a view illustrating construction of the nonwoven fabric-integrated sleeper pad and a concrete sleeper in the method of constructing the nonwoven fabric-integrated sleeper pad using the rubber pad embedded with the stiffener according to an embodiment of the present disclosure.
Figure 17:
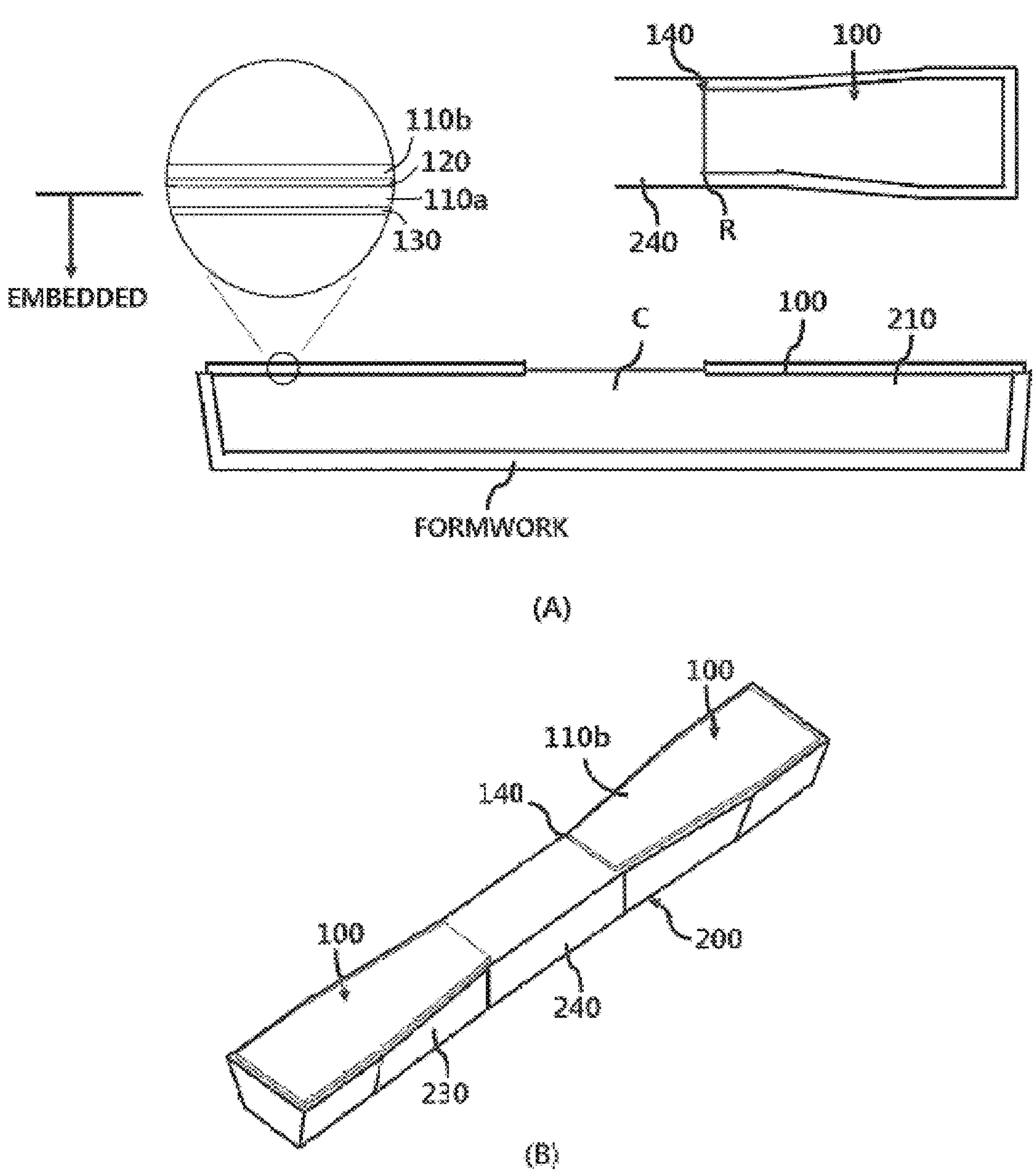
FIG. 17 is a perspective view illustrating a configuration of the nonwoven fabric-integrated sleeper pad in the method of constructing the nonwoven fabric-integrated sleeper pad using the rubber pad embedded with the stiffener according to an embodiment of the present disclosure.

Meanwhile, FIG. 16 is a view illustrating construction of the nonwoven fabric-integrated sleeper pad and a concrete sleeper in the method of constructing the nonwoven fabric-integrated sleeper pad using the rubber pad embedded with the stiffener according to an embodiment of the present disclosure, and FIG. 17 is a perspective view illustrating a configuration of the nonwoven fabric-integrated sleeper pad in the method of constructing the nonwoven fabric-integrated sleeper pad using the rubber pad embedded with the stiffener according to an embodiment of the present disclosure.

In the case of the method of constructing the nonwoven fabric-integrated sleeper pad using the rubber pad embedded with the stiffener according to an embodiment of the present disclosure, as illustrated in FIGS. 16 and 17, the attaching nonwoven fabric 130 is embedded in a surface of concrete using a separate pressing plate 210 so that the nonwoven fabric-integrated sleeper pad 100 is able to be set with an equivalent pressure on the concrete C placed in the sleeper formwork, and in a process in which the concrete C for manufacturing the concrete sleeper 200 is cured, the nonwoven fabric-integrated sleeper pad 100 is attached to the bottom surface of the concrete sleeper 200.

Here, when the pressing plate 210 is used, since the rubber pad 110 is rolled due to being initially provided in the form of a roll, the nonwoven fabric-integrated sleeper pad 100 can be attached while securing the flatness.

Also, the attaching nonwoven fabric 130 is made of a sponge material with a dense surface texture which is a porous material formed to have elasticity, be freely deformable, and allow permeation of water included in concrete to some extent. Then, when manufacturing the concrete sleeper 200, in a case in which the nonwoven fabric-integrated sleeper pad 100 is manufactured to be integrated with the bottom surface of the concrete sleeper 200, the attaching nonwoven fabric 130 may serve as a connecting member.

Also, as illustrated in FIG. 16, the sleeper pad 100 using the rubber pad 110 in close contact with the attaching nonwoven fabric 130 may be formed throughout the entire bottom surface of the concrete sleeper 200, but, in particular, the corner portion 140 of the nonwoven fabric-integrated sleeper pad 100 may be subject to a rounding treatment R to more reliably secure the attaching force with the concrete sleeper 200.

That is, since the corner portion of the nonwoven fabric-integrated sleeper pad 100 is a portion vulnerable to damage or the like caused by repeated loads, the corner portion may be treated to be rounded, instead of being a sharp corner, to remove the vulnerable portion.

Also, for the nonwoven fabric-integrated sleeper pad 100 using the rubber pad embedded with the stiffener according to an embodiment of the present disclosure, in order to prevent a decrease in adhesion performance of the corner portion 140 and prevent a sleeper corner portion from becoming vulnerable, for example, as illustrated in FIGS. 16 and 17, the rubber pad 110 may be cut to be apart by about 1 cm from an end of the concrete sleeper 200, and the nonwoven fabric-integrated sleeper pad 100 may be installed only in a section which is about 1 m from an end of the sleeper (portions of the expansion flanges at both ends and the intermediate connecting portion), which is a site where a load is intensively transmitted by a rail, thus securing economic feasibility and improving efficiency.

Figure 18:
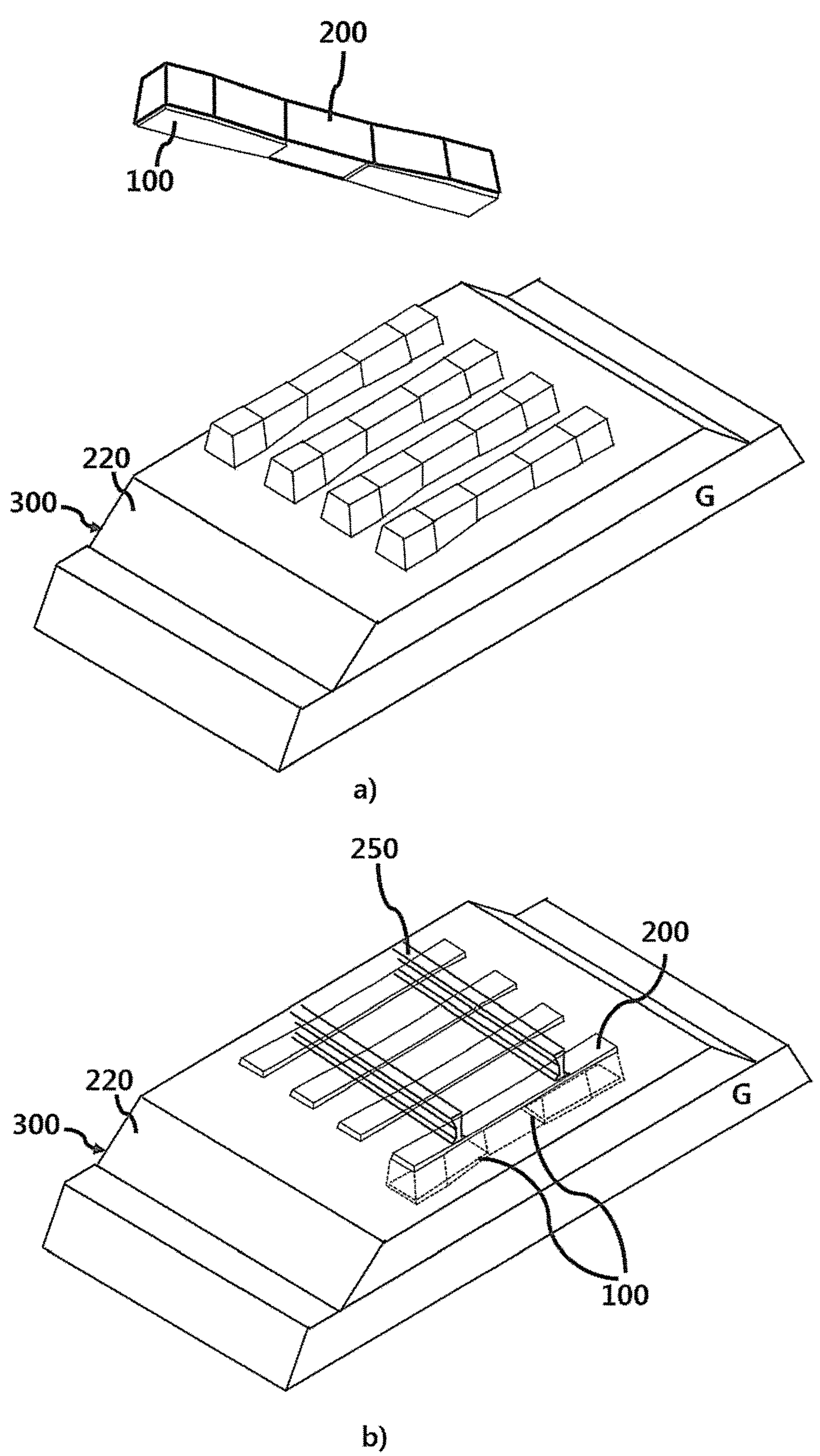
FIG. 18 is a view for describing in detail the method of constructing the nonwoven fabric-integrated sleeper pad using the rubber pad embedded with the stiffener according to an embodiment of the present disclosure.

Meanwhile, FIG. 18 is a view for describing in detail the method of constructing the nonwoven fabric-integrated sleeper pad using the rubber pad embedded with the stiffener according to an embodiment of the present disclosure.

The method of constructing the nonwoven fabric-integrated sleeper pad using the rubber pad embedded with the stiffener according to an embodiment of the present disclosure may be referred to as a method of installing the nonwoven fabric-integrated sleeper pad 100 according to an embodiment of the present disclosure on the gravel ballast 300 for new construction, maintenance and repair, and the like.

As illustrated in a) of FIG. 18, first, the nonwoven fabric-integrated sleeper pad 100 made of the rubber pad 110 integrated with the attaching nonwoven fabric 130 coming in close contact therewith is manufactured.

Here, in the nonwoven fabric-integrated sleeper pad 100, the lower rubber pad 110*a* and the attaching nonwoven fabric 130 may be integrated by mechanical coupling, which allows the attaching nonwoven fabric 130 to entangle and come in close contact with the bottom surface of the lower rubber pad 110 by being heated and pressed, and by chemical bonding due to vulcanization.

The nonwoven fabric-integrated sleeper pad 100 is cut to a necessary size and, when manufacturing the concrete sleeper 200, is attached to the bottom surface of the concrete sleeper 200 using the pressing plate 210.

That is, as described above, using the pressing plate 210, the attaching nonwoven fabric 130 is embedded in a surface of the concrete C placed in the sleeper formwork, and the rubber pad 110 is allowed to be exposed to the bottom surface of the concrete sleeper 200. In this way, as the placed concrete C is cured, the nonwoven fabric-integrated sleeper pad 100 is naturally attached to the bottom surface of the concrete sleeper 200.

When the nonwoven fabric-integrated sleeper pad 100 is attached in this way, it is easy to secure the attaching force as compared to the method using an adhesive, an anchor, or the like according to the related art, and since attachment is performed by curing concrete, it becomes possible to resist impact load in a high frequency range. Thus, a gravel maintenance cycle of the gravel ballast 300 can be optimized.

Also, since it also becomes possible to minimize damage to the gravel 220 that comes in contact with the nonwoven fabric-integrated sleeper pad 100, economic feasibility can be secured.

Also, in order to prevent a decrease in adhesion performance of the corner portion 140 of the nonwoven fabric-integrated sleeper pad 100 and prevent a sleeper corner portion from becoming vulnerable, the nonwoven fabric-integrated sleeper pad 100 according to an embodiment of the present disclosure may be installed only in a section which is about 1 m from an end of the sleeper, which is a site where a load is intensively transmitted by a rail, and since the corner portion of the nonwoven fabric-integrated sleeper pad 100 on the bottom surface of the rubber pad is a portion vulnerable to damage or the like caused by repeated loads, the corner portion may be subject to a rounding treatment R, instead of being a sharp corner, to remove the vulnerable portion.

Next, as illustrated in b) of FIG. 18, the concrete sleeper 200 having the nonwoven fabric-integrated sleeper pad 100 attached to the bottom surface thereof is set on the gravel ballast 300.

Here, the gravel ballast 300 is formed by laying gravel with a predetermined thickness on a roadbed G (including an auxiliary ballast or the like) in a gravel track. A load transmitted due to a train or the like is distributed by the gravel 220, and the sleeper 200 made of concrete is set on an upper surface of the gravel ballast 300.

Accordingly, when a direction in which a train or the like advances is a longitudinal direction, the concrete sleeper 200 may be disposed to extend in a transverse direction. Generally, the concrete sleeper 200 is formed of the expansion flanges 230 at both ends and the intermediate connecting portion 240 configured to connect therebetween.

Here, since the sleeper pad 100 exposed to the bottom surface of the expansion flanges 230 at both ends comes in contact with the gravel 220, and the load transmitted due to a train or the like is concentrated on the expansion flanges 230 at both ends, more efficient load transfer and support are possible. Here, a rail 250 may be installed to extend in the longitudinal direction through a fastening device on the expansion flanges 230 at both ends.

Also, impact load due to a train or the like operated through the rail 250 is transferred to the gravel 220 through the nonwoven fabric-integrated sleeper pad 100 attached to the concrete sleeper 200, the laid gravel 220 has an effect of distributing a transferred load and providing support, and it becomes possible to reduce wear and breakage of gravel by reducing stress transmitted to the gravel ballast 300 in the gravel track.

Also, the concrete sleeper 200 having the nonwoven fabric-integrated sleeper pad 100 according to an embodiment of the present disclosure attached to the bottom surface thereof may be applied during new construction and maintenance and repair of a gravel rack (gravel roadbed) for railroads and, in particular, may be easily applied to sites where severe settlement occurs or sites where support stiffness changes, such as a turnout or a joint.

Consequently, according to an embodiment of the present disclosure, by embedding a stiffener in the middle of a rubber pad attached to a lower portion of a concrete sleeper to adjust vertical support stiffness and secure flatness, utilization and quality of a pad-attached sleeper can be increased, and accordingly, due to the improvement in the quality of the rubber pad and the pad-attached sleeper, an effect of increasing service life of gravel below the pad-attached sleeper and service life of the sleeper can be expected.

Also, a rubber pad-attached concrete sleeper may be applied during new construction and maintenance and repair of a gravel ballast for railroads and may be applied to sites where severe settlement occurs or sites where support stiffness changes, such as a turnout or a joint.

According to the present disclosure, in a sleeper pad for railroad sleepers in which a nonwoven fabric is attached to a rubber pad by a thermal fusion process, vertical support stiffness of the rubber pad can be adjusted by the stiffener embedded in the middle of the rubber pad, and the flatness of the rubber pad can be secured by resisting bending deformation due to a difference in shrinkage between rubber and nonwoven fabric.

According to the present disclosure, by embedding a stiffener in the middle of a rubber pad attached to a lower portion of a concrete sleeper to adjust vertical support stiffness and secure flatness, utilization and quality of a pad-attached sleeper can be increased, and accordingly, due to the improvement in the quality of the rubber pad and the pad-attached sleeper, an effect of increasing service life of gravel below the pad-attached sleeper and service life of the sleeper can be expected.

According to the present disclosure, a rubber pad-attached concrete sleeper can be applied during new construction and maintenance and repair of a gravel ballast for railroads and can be applied to sites where severe settlement occurs or sites where support stiffness changes, such as a turnout or a joint.

The above-given description of the present disclosure is merely illustrative, and those of ordinary skill in the art to which the present disclosure pertains should understand that the present disclosure may be easily modified in other specific forms without changing the technical spirit or essential features of the present disclosure. Therefore, the embodiments described above should be understood as being illustrative, instead of limiting, in all aspects. For example, each element described as a single type may also be embodied in a distributed manner, and likewise, elements described as being distributed may also be embodied in a combined form.

The scope of the present disclosure is defined by the appended claims rather than by the detailed description above, all changes or modifications derived from the meaning and scope of the claims and their equivalents should be interpreted as falling within the scope of the present disclosure.

What is claimed is:

1. A nonwoven fabric-integrated sleeper pad using a rubber pad embedded with a stiffener, the nonwoven fabric-integrated sleeper pad comprising:

a rubber pad formed of multiple layers including a lower rubber pad and an upper rubber pad, integrated with an attaching nonwoven fabric, and exposed to a bottom surface of a concrete sleeper;

a stiffener horizontally embedded in the rubber pad; and the attaching nonwoven fabric configured to come in close contact with a bottom surface of the lower rubber pad of the rubber pad and embedded in the bottom surface of the concrete sleeper, wherein the stiffener resists horizontal deformation of the rubber pad to increase vertical stiffness, and the attaching nonwoven fabric is embedded by being pressed toward a surface of concrete placed in a sleeper formwork, and as the placed concrete is cured, the nonwoven fabric-integrated sleeper pad is embedded in the bottom surface of the concrete sleeper to secure an attaching force with the concrete sleeper, wherein the rubber pad is cut to be apart from an end of the concrete sleeper, wherein the concrete sleeper in which the attaching nonwoven fabric is embedded is a concrete sleeper including an intermediate connecting portion disposed between expansion flanges at both ends, and the nonwoven fabric-integrated sleeper pad which is exposed only to bottom surfaces of the expansion flanges at both ends comes in contact with gravel.

2. The nonwoven fabric-integrated sleeper pad of claim 1, wherein the stiffener is formed of a lattice-shaped glass fiber and is provided as one or more stiffeners horizontally disposed in a middle of the rubber pad.

3. The nonwoven fabric-integrated sleeper pad of claim 1, wherein the stiffener is horizontally mounted on an upper portion of the lower rubber pad of the rubber pad and is adhered using an adhesive.

4. The nonwoven fabric-integrated sleeper pad of claim 1, wherein, in a state in which the stiffener is horizontally embedded between the lower rubber pad and the upper rubber pad, the lower rubber pad and the upper rubber pad are adhered to each other by a thermal fusion process.

5. The nonwoven fabric-integrated sleeper pad of claim 1, wherein the rubber pad includes:

the lower rubber pad having a bottom surface with which the attaching nonwoven fabric comes in close contact and an upper surface on which the stiffener is mounted; and the upper rubber pad adhered to the lower rubber pad by a thermal fusion process, wherein the upper rubber pad is provided as one or more upper rubber pads which are sequentially stacked, and the rubber pad is formed of multiple layers.

6. The nonwoven fabric-integrated sleeper pad of claim 5, wherein, in a process in which the lower rubber pad in close contact with the attaching nonwoven fabric is heated and pressed, the attaching nonwoven fabric and the lower rubber pad are entangled on a close contact surface, thus coming in close contact and being mechanically coupled, and are chemically bonded as the close contact surface between the attaching nonwoven fabric and the lower rubber pad is melted and diffused due to vulcanization, thus allowing the attaching nonwoven fabric to be integrated with the bottom surface of the lower rubber pad.

7. The nonwoven fabric-integrated sleeper pad of claim 1, wherein the attaching nonwoven fabric is embedded in a surface of the concrete using a pressing plate so that the nonwoven fabric-integrated sleeper pad is able to be set with an equivalent pressure on the concrete placed in the sleeper formwork, and in a process in which the concrete for manufacturing the concrete sleeper is cured, the nonwoven fabric-integrated sleeper pad is attached to the bottom surface of the concrete sleeper.

8. The nonwoven fabric-integrated sleeper pad of claim 1, wherein the nonwoven fabric-integrated sleeper pad is attached only to a portion where a load is intensively transmitted by a rail, and by performing a rounding treatment on a corner portion of the nonwoven fabric-integrated sleeper pad, an attaching force with the concrete sleeper is secured.

9. The nonwoven fabric-integrated sleeper pad of claim 1, wherein, for the rubber pad, an ethylene propylene diene monomer compounded rubber is formed into a thin sheet plate, and the rubber pad is integrated with the attaching nonwoven fabric having a surface made of a dense material and is used as the nonwoven fabric-integrated sleeper pad.

10. A method of manufacturing a nonwoven fabric-integrated sleeper pad using a rubber pad embedded with a stiffener, the method comprising:

a) manufacturing ethylene propylene diene monomer compounded rubber in which EPDM and rubber are mixed with a mixer;

b) winding an attaching nonwoven fabric having a surface made of a dense material around a roll;

c) manufacturing a lower rubber pad and an upper rubber pad by forming a thin plate in which the ethylene propylene diene monomer compounded rubber is formed into a sheet through a calendering process;

d) mounting and adhering a lattice-shaped stiffener onto the lower rubber pad;

e) forming a rubber pad embedded with the stiffener by adhering the upper rubber pad to the lower rubber pad by a thermal fusion process;

f) bringing the attaching nonwoven fabric in close contact with a bottom surface of the rubber pad embedded with the stiffener;

g) by, through a rotor curing process, heating and pressing the lower rubber pad in close contact with the attaching nonwoven fabric, allowing the attaching nonwoven fabric and the lower rubber pad to be entangled on a close contact surface and mechanically coupled;

h) allowing the attaching nonwoven fabric and the lower rubber pad to be integrated by a chemical bonding process as the close contact surface between the attaching nonwoven fabric and the lower rubber pad is melted and diffused due to vulcanization; and i) cutting the rubber pad, with which the nonwoven fabric is in close contact by being mechanically coupled and chemically bonded thereto, in a predetermined size to form the nonwoven fabric-integrated sleeper pad, wherein the stiffener is horizontally embedded in the rubber pad to resist horizontal deformation of the rubber pad and increase vertical stiffness, and the attaching nonwoven fabric is embedded by being pressed toward a surface of concrete placed in a sleeper formwork, and as the placed concrete is cured, the nonwoven fabric-integrated sleeper pad is embedded in a bottom surface of the concrete sleeper to secure an attaching force with the concrete sleeper, wherein the rubber pad is cut to be apart from an end of the concrete sleeper, wherein the concrete sleeper in which the attaching nonwoven fabric is embedded is a concrete sleeper including an intermediate connecting portion disposed between expansion flanges at both ends, and the nonwoven fabric-integrated sleeper pad which is exposed only to bottom surfaces of the expansion flanges at both ends comes in contact with gravel.

11. The method of claim 10, wherein the stiffener is formed of a lattice-shaped glass fiber and is provided as one or more stiffeners horizontally disposed in a middle of the rubber pad.

12. The method of claim 10, wherein the stiffener is horizontally mounted on an upper portion of the lower rubber pad of the rubber pad and is adhered using an adhesive.

13. The method of claim 10, wherein, in a state in which the stiffener is horizontally embedded between the lower rubber pad and the upper rubber pad, the lower rubber pad and the upper rubber pad are adhered to each other by a thermal fusion process.

14. A method of constructing a nonwoven fabric-integrated sleeper pad using a rubber pad embedded with a stiffener, the method comprising:

a) forming a nonwoven fabric-integrated sleeper pad, with which an attaching nonwoven fabric is in close contact, on a bottom surface of a rubber pad embedded with a stiffener;

b) placing concrete in a sleeper formwork;

c) pressing a surface of the concrete placed in the sleeper formwork so that the attaching nonwoven fabric of the nonwoven fabric-integrated sleeper pad is embedded;

d) as the placed concrete is cured, integrating the nonwoven fabric-integrated sleeper pad with a bottom surface of a concrete sleeper; and e) placing the concrete sleeper having the nonwoven fabric-integrated sleeper pad (100) attached to the bottom surface thereof on a gravel ballast, wherein the stiffener of step a) is horizontally embedded in the rubber pad to resist horizontal deformation of the rubber pad and increase vertical stiffness, and the attaching nonwoven fabric is embedded by being pressed toward a surface of concrete placed in the sleeper formwork, and as the placed concrete is cured, the nonwoven fabric-integrated sleeper pad is embedded in a bottom surface of the concrete sleeper to secure an attaching force with the concrete sleeper, wherein the rubber pad is cut to be apart from an end of the concrete sleeper, wherein the concrete sleeper in which the attaching nonwoven fabric is embedded is a concrete sleeper including an intermediate connecting portion disposed between expansion flanges at both ends, and the nonwoven fabric-integrated sleeper pad which is exposed only to bottom surfaces of the expansion flanges at both ends comes in contact with gravel.

15. The method of claim 14, wherein the rubber pad is formed of multiple layers including the lower rubber pad and the upper rubber pad, is integrated with the attaching nonwoven fabric, and is exposed to the bottom surface of the concrete sleeper.

16. The method of claim 15, wherein the stiffener is formed of a lattice-shaped glass fiber, is horizontally mounted on an upper portion of the lower rubber pad of the rubber pad, and is adhered using an adhesive.

17. The method of claim 15, wherein, in a state in which the stiffener is horizontally embedded between the lower rubber pad and the upper rubber pad, the lower rubber pad and the upper rubber pad are adhered to each other by a thermal fusion process.

18. The method of claim 15, wherein, in a process in which the lower rubber pad in close contact with the attaching nonwoven fabric is heated and pressed, the attaching nonwoven fabric and the lower rubber pad are allowed to be entangled on a close contact surface and mechanically coupled, and by the attaching nonwoven fabric and the lower rubber pad being chemically bonded as the close contact surface between the attaching nonwoven fabric and the lower rubber pad is melted and diffused by vulcanization, the attaching nonwoven fabric is integrated with a bottom surface of the lower rubber pad.

19. The method of claim 15, wherein the attaching nonwoven fabric is embedded in a surface of concrete using a pressing plate so that the nonwoven fabric-integrated sleeper pad is able to be set with an equivalent pressure on the concrete placed in the sleeper formwork, and in a process in which the concrete for manufacturing the concrete sleeper is cured, the nonwoven fabric-integrated sleeper pad is attached to the bottom surface of the concrete sleeper.

* * * * *